United States Patent
Bergen

(10) Patent No.: US 12,361,825 B2
(45) Date of Patent: Jul. 15, 2025

(54) TRAFFIC SIGNAL SYSTEMS FOR COMMUNICATING WITH VEHICLE SENSORS

(71) Applicant: Deere & Company, Moline, IL (US)

(72) Inventor: Scott Bergen, New Cannan, CT (US)

(73) Assignee: Deere & Company, Moline, IL (US)

(*) Notice: Subject to any disclaimer, the term of this patent is extended or adjusted under 35 U.S.C. 154(b) by 551 days.

(21) Appl. No.: 17/850,656

(22) Filed: Jun. 27, 2022

(65) Prior Publication Data
US 2023/0098184 A1    Mar. 30, 2023

Related U.S. Application Data

(63) Continuation-in-part of application No. 17/479,621, filed on Sep. 20, 2021, now abandoned.

(51) Int. Cl.
*G08G 1/09*     (2006.01)
*G01S 13/32*    (2006.01)
(Continued)

(52) U.S. Cl.
CPC ............ *G08G 1/092* (2013.01); *G01S 13/325* (2013.01); *G01S 13/91* (2013.01); *G08G 1/052* (2013.01);
(Continued)

(58) Field of Classification Search
CPC ........ G08G 1/092; G08G 1/052; G08G 1/095; G08G 1/096725; G01S 13/325; G01S 13/91
(Continued)

(56) References Cited

U.S. PATENT DOCUMENTS 4,027,840 A    6/1977  Blair
5,483,241 A    1/1996  Waineo et al.
(Continued)

FOREIGN PATENT DOCUMENTS

WO    2013/141923 A2    9/2013

OTHER PUBLICATIONS

International Search Report and Written Opinion received for International Patent Application No. PCT/US22/44155, mailed on Apr. 13, 2023, 10 pages.
(Continued)

*Primary Examiner* — Nuzhat Pervin
(74) *Attorney, Agent, or Firm* — Gary L. Montle; Lucian Wayne Beavers; Patterson Intellectual Property Law, PC

(57) ABSTRACT

The present disclosure is directed to a traffic signal apparatus communication system and methods of communicating traffic information to vehicles using same. The traffic signal apparatus communication system includes a traffic signal apparatus for providing a message to a vehicle. The apparatus includes at least one spatially encoded marker, and the vehicle is configured to receive returns of a radar signal from the spatially-encoded marker. At least one controller of the vehicle is configured to determine the message encoded by the spatially-encoded marker based on the returns and to control the vehicle based on the message. The message may include a value indicating a time to a transition of a new state of the traffic signal apparatus, where the new state includes emission of light from one of a first light source, a second light source, or a third light source of the traffic signal apparatus.

22 Claims, 16 Drawing Sheets

(51) Int. Cl.
  *G01S 13/91* (2006.01)
  *G08G 1/052* (2006.01)
  *G08G 1/095* (2006.01)
  *G08G 1/0967* (2006.01)

(52) U.S. Cl.
  CPC ....... *G08G 1/095* (2013.01); *G08G 1/096725* (2013.01)

(58) Field of Classification Search
  USPC ........................................................ 701/117
  See application file for complete search history.

(56) References Cited

U.S. PATENT DOCUMENTS

| | | | |
|---|---|---|---|
| 5,917,430 A | 6/1999 | Greneker, III et al. | |
| 7,426,437 B2 | 9/2008 | Breed et al. | |
| 7,558,674 B1* | 7/2009 | Neilley | G01W 1/02 702/3 |
| 7,610,146 B2* | 10/2009 | Breed | G01C 21/28 701/300 |
| 7,791,503 B2* | 9/2010 | Breed | G01S 17/86 340/993 |
| 7,983,836 B2* | 7/2011 | Breed | G08G 1/161 340/441 |
| 8,000,897 B2* | 8/2011 | Breed | G05D 1/0274 701/532 |
| 8,160,758 B2* | 4/2012 | Call | G01S 7/4004 701/301 |
| 8,630,795 B2* | 1/2014 | Breed | G01C 21/3697 701/1 |
| 8,892,271 B2 | 11/2014 | Breed | |
| 8,965,677 B2 | 2/2015 | Breed et al. | |
| 9,103,671 B1* | 8/2015 | Breed | G01S 13/865 |
| 9,261,879 B2* | 2/2016 | Ferguson | G08G 1/096758 |
| 9,594,373 B2* | 3/2017 | Solyom | G08G 1/16 |
| 9,733,642 B2* | 8/2017 | Hashimoto | B60W 50/14 |
| 9,940,839 B2* | 4/2018 | Stafford | E01F 9/615 |
| 10,013,878 B2* | 7/2018 | Ricci | H04L 67/12 |
| 10,127,462 B1 | 11/2018 | Pratt et al. | |
| 10,404,261 B1* | 9/2019 | Josefsberg | G01S 13/931 |
| 10,571,280 B2* | 2/2020 | Pratt | G01S 7/412 |
| 10,723,281 B1* | 7/2020 | Briggs | G01S 7/497 |
| 11,105,905 B2* | 8/2021 | Briggs | G01S 7/4972 |
| 11,199,413 B2* | 12/2021 | Weissman | G01S 17/06 |
| 11,293,758 B2 | 4/2022 | Hamilton et al. | |
| 11,334,089 B1* | 5/2022 | Bryce | G02B 5/136 |
| 11,816,981 B2* | 11/2023 | Dulberg | G08G 1/0116 |
| 2005/0046597 A1* | 3/2005 | Hutchison | G08G 1/07 340/917 |
| 2005/0187701 A1* | 8/2005 | Baney | G08G 1/096716 340/907 |
| 2007/0109111 A1 | 5/2007 | Breed et al. | |
| 2007/0152804 A1* | 7/2007 | Breed | G08G 1/096783 701/301 |
| 2007/0242338 A1* | 10/2007 | Bradley | G06V 20/584 340/5.1 |
| 2007/0242339 A1* | 10/2007 | Bradley | B60Q 1/0017 340/5.1 |
| 2008/0040023 A1* | 2/2008 | Breed | G05D 1/0278 701/472 |
| 2008/0040029 A1* | 2/2008 | Breed | G08G 1/161 701/514 |
| 2008/0042815 A1* | 2/2008 | Breed | G05D 1/0246 340/435 |
| 2008/0122606 A1* | 5/2008 | Bradley | B60Q 1/0017 340/468 |
| 2008/0122607 A1* | 5/2008 | Bradley | H04B 10/1125 340/475 |
| 2008/0147253 A1* | 6/2008 | Breed | G01C 21/3697 701/3 |
| 2008/0150786 A1* | 6/2008 | Breed | B60W 30/04 342/53 |
| 2008/0167821 A1* | 7/2008 | Breed | G08G 1/161 701/301 |
| 2009/0030605 A1* | 1/2009 | Breed | B60W 30/18154 340/901 |
| 2009/0033540 A1* | 2/2009 | Breed | G05D 1/0278 701/472 |
| 2009/0140887 A1* | 6/2009 | Breed | G01C 21/1656 701/116 |
| 2010/0280751 A1* | 11/2010 | Breed | G08G 1/161 701/414 |
| 2012/0264376 A1* | 10/2012 | Breed | G08G 1/161 455/66.1 |
| 2012/0323474 A1* | 12/2012 | Breed | G08G 1/161 701/117 |
| 2013/0038461 A1* | 2/2013 | Hawkes | G08G 1/087 340/815.4 |
| 2014/0104051 A1* | 4/2014 | Breed | G06V 20/56 340/435 |
| 2014/0277901 A1* | 9/2014 | Ferguson | G08G 1/096758 701/27 |
| 2014/0368378 A1* | 12/2014 | Crain | G01S 13/867 342/25 A |
| 2015/0025788 A1* | 1/2015 | Crain | H01Q 1/007 342/25 A |
| 2016/0076207 A1* | 3/2016 | Moran | G08G 1/096716 340/905 |
| 2016/0155334 A1* | 6/2016 | Jansson | G08G 1/07 340/906 |
| 2016/0231746 A1* | 8/2016 | Hazelton | G05D 1/0274 |
| 2016/0282879 A1* | 9/2016 | Ichikawa | G08G 1/095 |
| 2017/0341643 A1* | 11/2017 | Gutmann | G08G 1/096725 |
| 2018/0047286 A1* | 2/2018 | Gage | G08G 1/07 |
| 2018/0244292 A1* | 8/2018 | Bailey | B61L 23/06 |
| 2018/0265082 A1* | 9/2018 | Gutmann | G08G 1/096725 |
| 2018/0277019 A1* | 9/2018 | Wrobel | G08G 1/09626 |
| 2018/0329033 A1* | 11/2018 | Pratt | E01F 9/30 |
| 2018/0330174 A1* | 11/2018 | Pratt | G01S 7/411 |
| 2019/0080612 A1 | 3/2019 | Weissman et al. | |
| 2019/0088148 A1* | 3/2019 | Jacobus | H04L 67/125 |
| 2019/0092360 A1* | 3/2019 | Green | B61L 25/021 |
| 2019/0098468 A1* | 3/2019 | Yamamoto | G08G 1/096716 |
| 2019/0310380 A1* | 10/2019 | Berton | G06V 20/182 |
| 2020/0166636 A1* | 5/2020 | Mihajlovic | G05D 1/0257 |
| 2020/0242922 A1* | 7/2020 | Dulberg | G08G 1/166 |
| 2020/0258392 A1* | 8/2020 | Weissman | G01S 13/876 |
| 2020/0284883 A1* | 9/2020 | Ferreira | G01S 7/4815 |
| 2020/0292323 A1* | 9/2020 | Rabel | G01C 21/32 |
| 2020/0292325 A1* | 9/2020 | Rabel | G01C 21/32 |
| 2020/0292328 A1* | 9/2020 | Rabel | G01C 21/3841 |
| 2020/0292331 A1* | 9/2020 | Rabel | G06F 16/909 |
| 2020/0370890 A1* | 11/2020 | Hamilton | G08G 1/04 |
| 2021/0039648 A1* | 2/2021 | Ferguson | G05D 1/0246 |
| 2021/0082297 A1* | 3/2021 | Jacobus | B60W 30/09 |
| 2021/0142658 A1* | 5/2021 | Grimm | G06V 20/584 |
| 2024/0038063 A1* | 2/2024 | Dulberg | G08G 1/005 |

OTHER PUBLICATIONS

"Enhanced RADAR Positioning," Wikipedia, Jan. 13, 2019, https://en.wikipedia.org/wiki/Enhanced_RADAR_positioning.

International Search Report for PCT/US2022/044135 dated Feb. 22, 2023.

Abatzoglou, et al., U.S. Appl. No. 17/375,994, entitled, "Methods and Systems for Processing Radar Signals," filed Jul. 14, 2021.

Bergen, U.S. Appl. No. 17/479,629, entitled, "Systems and Methods for Communicating with Vehicles Using Radar," filed Sep. 20, 2021.

\* cited by examiner

TRAFFIC SIGNAL SYSTEMS FOR COMMUNICATING WITH VEHICLE SENSORS

RELATED APPLICATION

This application is a continuation-in-part of application Ser. No. 17/479,621, filed on Sep. 20, 2021, titled "Systems and Methods for Determining the Local Position of a Vehicle Using Radar," the entire contents of which are incorporated herein.

TECHNICAL FIELD

The present disclosure is directed to systems and methods for communicating traffic information to vehicles using a traffic signal apparatus.

RELATED ART

Radar technology has been incorporated in many autonomous vehicles to aid in safe navigation. Generally, these radar systems include a transmitter that sends out radio waves and a receiver that detects the returning waves after they encounter an object. An autonomous vehicle, such as an autonomous automobile, then may determine the speed and distance of the object and, optionally, perform actions related to that information. For example, upon detecting an object within the trajectory of a vehicle, the vehicle may alert the driver or pilot, perform evasive actions to avoid a collision (e.g., when the vehicle is autonomous), or a combination of these or other actions. Further, radar systems in vehicles often work in conjunction with other sensing systems, such as cameras, to gather information related to the vehicle's environment and performance.

Current autonomous vehicle sensing systems primarily serve to aid in safe navigation by sensing the surroundings of a vehicle. For example, a uniform scan may be performed to range and detect objects in proximity to the vehicle. The sensing is often undertaken using cameras that interpret environmental details visually, and with optional assistance from other sensing systems. Cameras can detect visual detail such as the presence of signs, animals, vehicles, or road dividers and boundaries. However, cameras are limited by the potential for visual impairment due to poor weather conditions and low light, and visual data may not be sufficient for the detection of all relevant objects. Lidar (light detection and ranging) and radar (radio detection and ranging) are useful sensing systems that may be used in conjunction with visual detection systems due to their ability to operate advantageously in different navigational situations. For instance, lidar can detect small objects with high precision, while radar functions well over long distances and in a wide range of weather conditions. While current applications of radar in autonomous vehicles are useful, other potentially valuable applications remain underdeveloped or unexplored. The present disclosure is directed to radar-based sensing systems and methods for implementation on vehicles. These radar systems and methods function as an improvement over the current vehicle sensing systems by conveying a wider range of information for interpretation by vehicle controller systems.

SUMMARY OF THE DISCLOSURE

In some embodiments of the present disclosure, a traffic signal communication system and is provided. The traffic signal apparatus communication system includes a traffic signal apparatus for controlling traffic at an intersection. The traffic signal apparatus has at least a first light source for emitting light of a first color for indicating stop signal, a second light source for emitting light of a second color for indicating a warning signal, and a third light source for emitting light of a third color for indicating a go signal. Further, the traffic signal apparatus includes at least one spatially-encoded marker. The traffic signal communication system also includes a vehicle having at least one controller and a radar. The radar is configured to transmit a radar signal and receive returns of the radar signal from the at least one spatially-encoded marker. The at least one controller is configured to determine a message encoded by the spatially-encoded marker based on the returns and to control the vehicle based on the message. The message may describe a traffic directive given by the traffic signal.

In some instances, the at least one controller is configured to identify a movement pattern of the at least one spatially-encoded marker based on the returns and to determine the message based on the identified movement pattern. In some instances, the at least one spatially-encoded marker comprises a movable element and an actuator coupled to the movable element, where the actuator is configured to move the movable element and the at least one controller is configured to determine the message based on movement of the movable element. In some cases, the at least one controller is configured to determine a value indicative of a speed of movement of the movable element, and the at least one controller is configured to determine the message based on the value. In some instances, the at least one controller is configured to identify a spatial pattern of the at least one spatially-encoded marker based on the returns and to determine the message based on the identified spatial pattern.

In some instances, the message indicates the traffic directive to stop the vehicle from entering a traffic intersection or to permit a vehicle to enter a traffic intersection, while in other instances, the message indicates the timing of the traffic directive to stop the vehicle from entering a traffic intersection or to permit a vehicle to enter a traffic intersection. In some instances, the message indicates the traffic directive to permit or to prohibit a traffic maneuver, where the traffic maneuver is a turn at a traffic intersection. In some instances, the message includes a value indicating a time to a transition of a new state of the traffic signal apparatus, where the new state includes emission of light from one of the first light source, the second light source, or the third light source.

In other embodiments, there is provided a method of communicating traffic signal information to a vehicle. The method includes receiving, by at least one controller, returns of a radar signal from at least one spatially-encoded marker of a traffic signal apparatus. A message encoded by the spatially-encoded marker is determined based on the returns, and the vehicle is controlled based on the message. The message may describe a traffic directive given by the traffic signal apparatus, and the vehicle may follow the traffic directive through the controlling.

In some instances, the method further includes identifying a spatial pattern of the at least one spatially-encoded marker based on the returns, where the determining of the message is based on the identified spatial pattern. In some cases, the identifying includes determining an orientation of the at least one spatially-encoded marker. In some instances, the method further includes identifying a movement pattern of the at least one spatially-encoded marker based on the returns, where the determining of the message is based on the identified movement pattern. In some instances, the at least one spatially-encoded marker includes a movable element, where the method further includes detecting movement of the movable element, and where the determining of the message is based on the detected movement of the movable element. In some instances, the method further includes determining a value indicative of a speed of movement of the movable element, and where the determining of the message is based on the value.

In some instances, the message indicates the traffic directive to stop the vehicle from entering a traffic intersection or to permit a vehicle to enter a traffic intersection, while in other instances, the message indicates the timing of the traffic directive to stop the vehicle from entering a traffic intersection or to permit a vehicle to enter a traffic intersection. In some instances, the message indicates the traffic directive to permit or to prohibit a traffic maneuver, where the traffic maneuver is a turn at the traffic intersection. In some instances, the traffic signal apparatus includes at least a first light source for emitting light of a first color for indicating stop signal, a second light source for emitting light of a second color for indicating a warning signal, and a third light source for emitting light of a third color for indicating a go signal. In some cases, the message includes a value indicating a time to a transition of a new state of the traffic signal apparatus, where the new state includes emission of light from one of the first light source, the second light source, or the third light source.

In yet other embodiments, there is provided a traffic signal apparatus communication system. The system includes a traffic signal apparatus for controlling traffic at an intersection, the traffic signal apparatus having at least a first light source, a second light source, and a third light source. Further, the traffic signal apparatus has at least one spatially-encoded marker. The system also includes a vehicle having at least one controller and a radar. The radar is configured to transmit a radar signal and receive returns of the radar signal from the at least one spatially-encoded marker, while the at least one controller is configured to determine a message encoded by the spatially-encoded marker based on the returns and to control the vehicle based on the message. The message may describe a traffic directive given by the traffic signal.

In some instances, the first light source is configured to emit light of a first color for indicating stop signal, the second light source is configured to emit light of a second color for indicating a warning signal, and the third light source is configured to emit light of a third color for indicating a go signal. In some embodiments, the message includes a value indicating a time to a transition of a new state of the traffic signal apparatus, wherein the new state includes emission of light from one of the first light source, the second light source, or the third light source.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is generally directed to systems and methods for communicating information to vehicles with radar using spatially-encoded markers. In some embodiments of the present disclosure, radar reflective markers are located near or along a path usable by a vehicle, which can be autonomous or driven by a driver. The locations of the radar reflective markers are such that they are detectable using vehicle-based radar. A radar transmitter located on or within a vehicle produces one or more electromagnetic waves, such as radio waves, which then encounter the disclosed radar reflective markers and reflect off the markers. Reflected waves from a given marker return to a radar receiver on or within the vehicle, conveying unique and unambiguous information related to at least one characteristic of the radar reflective marker or spatial arrangement of radar reflective markers. In this manner, the vehicle may interpret the detected signals to indicate the location, speed, or lane position of the vehicle, as well as information about the vehicle's environment, such as mile markers, traffic direction, or adverse road conditions. Vehicles may utilize the information conveyed by the radar reflective markers in various ways, such as to provide an alert to a driver or passengers, perform evasive maneuvers, adjust vehicle velocity or position, or otherwise control the vehicle.

Figure 1:
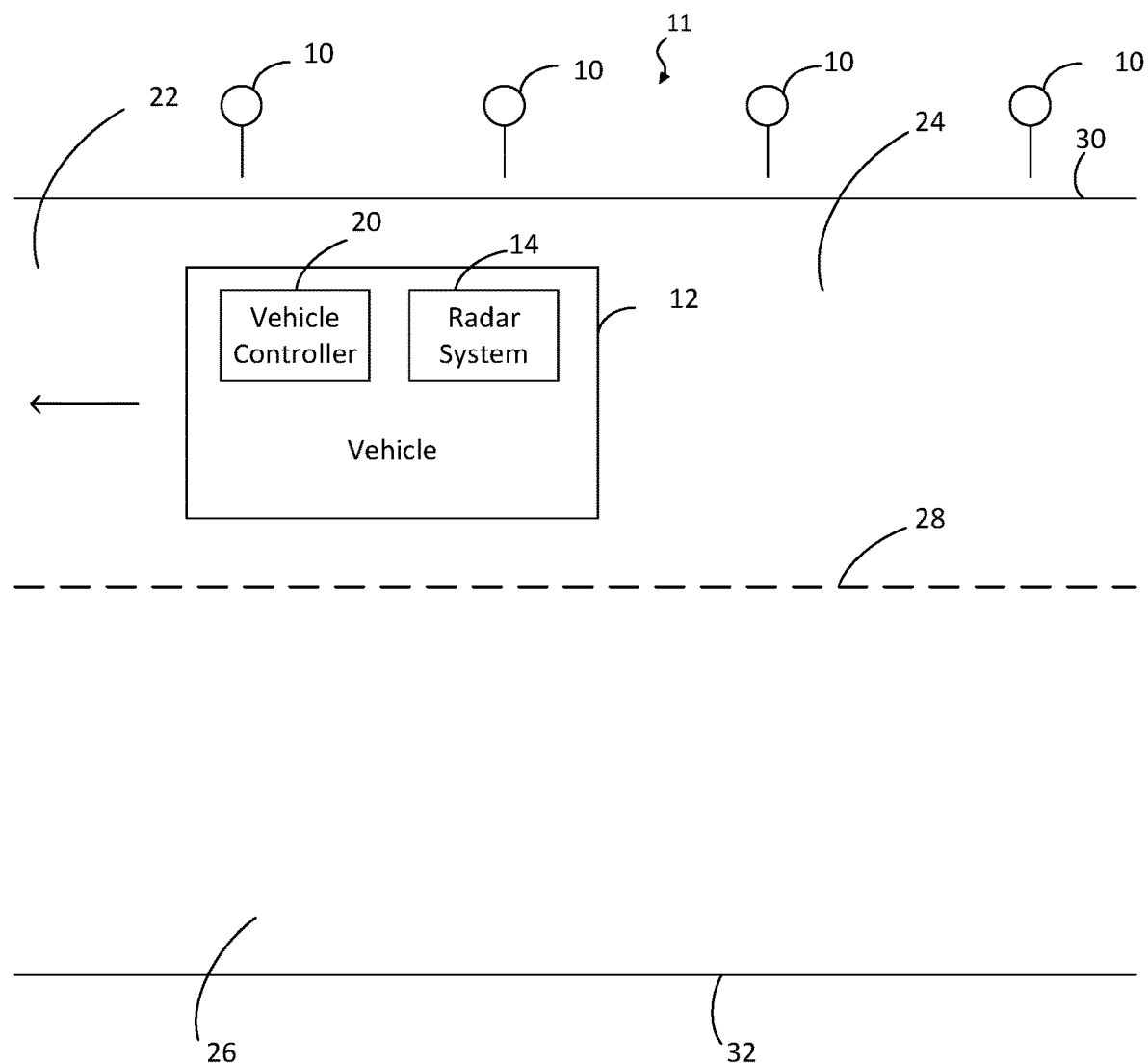
FIG. 1 is a schematic illustration of an exemplary embodiment of a radar-based information system of the present disclosure, with markers located outside of a radar-equipped vehicle to convey information to the vehicle.
Figure 2:
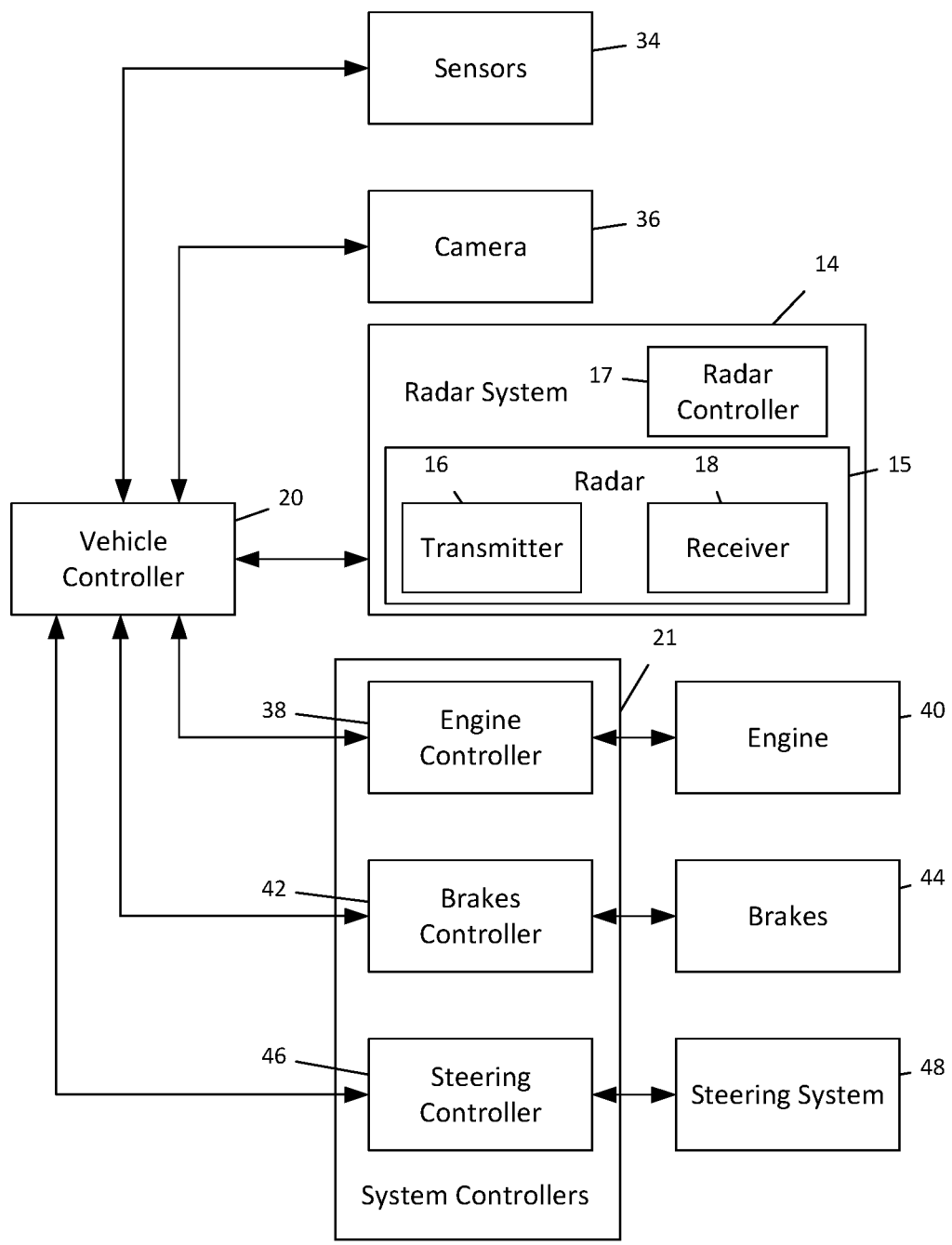
FIG. 2 is a block diagram illustrating components of a vehicle for detecting, interpreting, and reacting to information provided by radar reflective markers, such as are depicted by FIG. 1.
Figure 3:
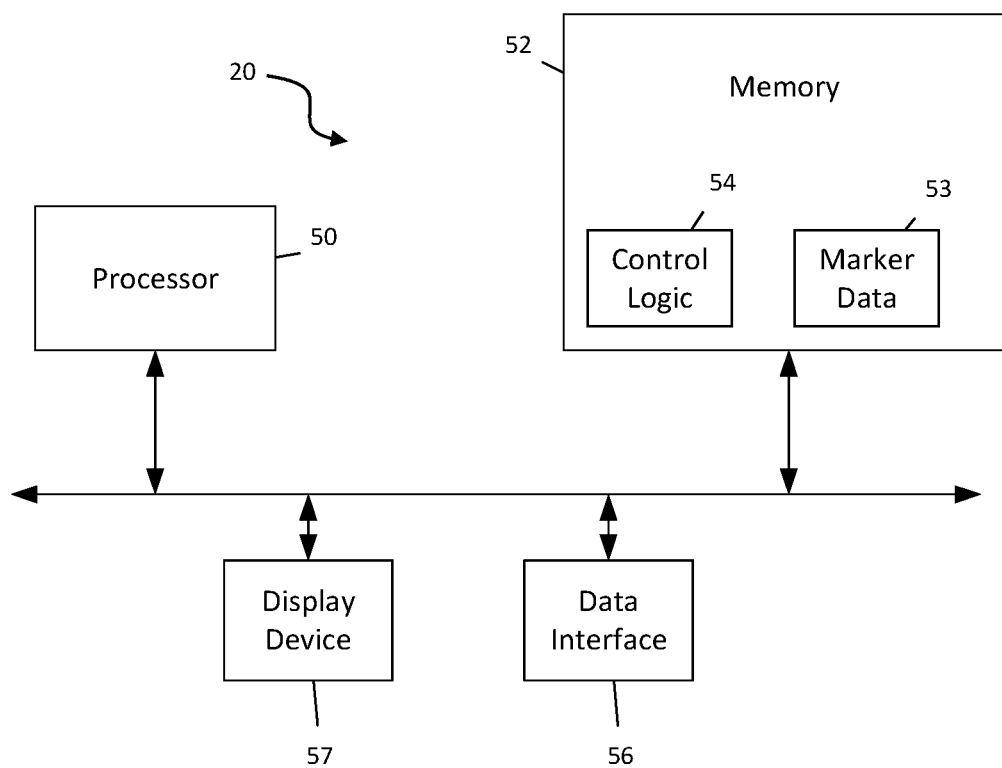
FIG. 3 is a block diagram illustrating an exemplary embodiment of a vehicle controller, such as is depicted by FIG. 2.
Figure 11:
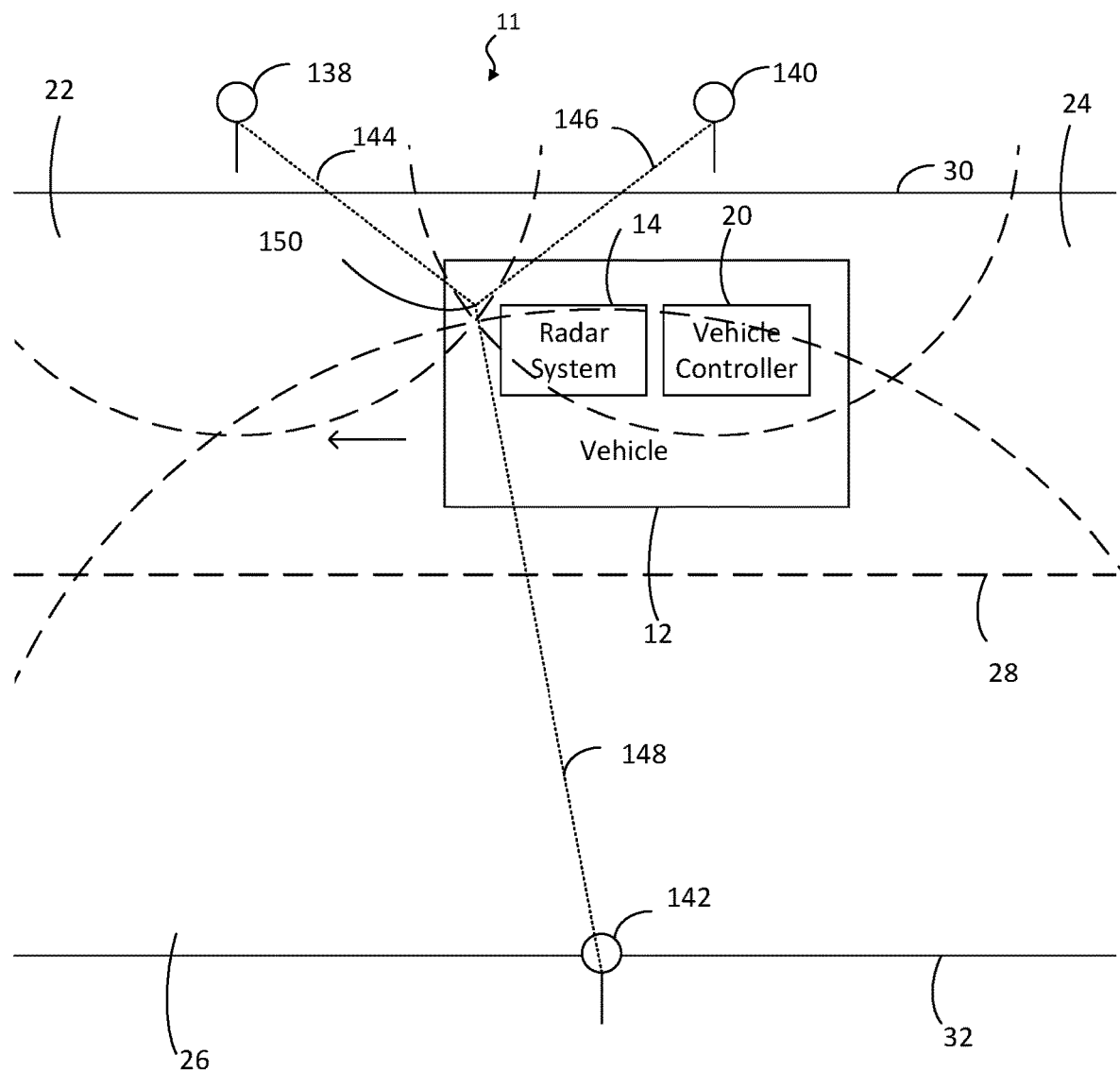
FIG. 11 is a schematic illustration of an exemplary embodiment of a radar-based information system of the present disclosure, where multilateration is employed using several markers to determine the location of a vehicle.
Figure 12:
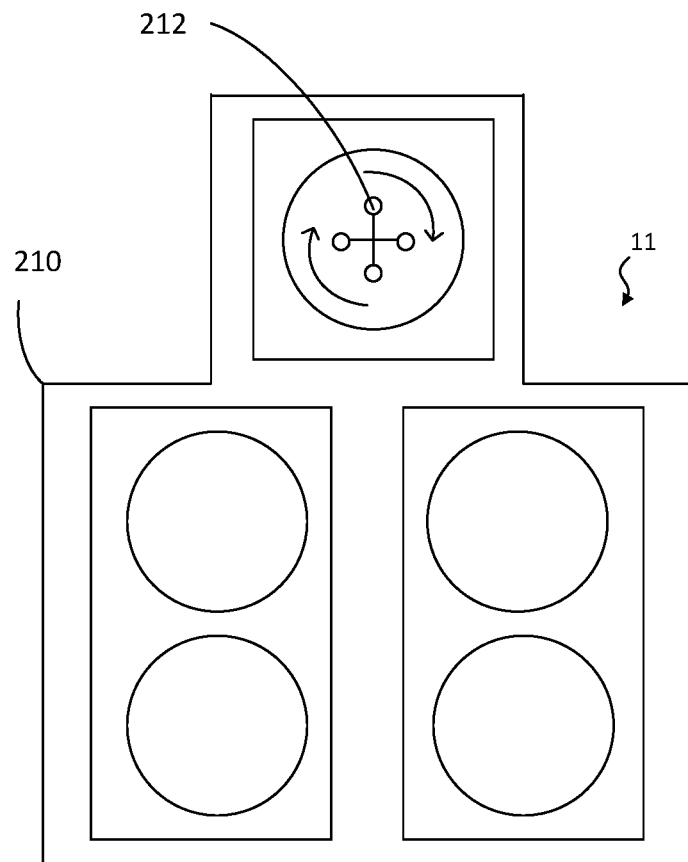
FIG. 12 is a schematic illustration of an exemplary embodiment of a radar-based information system of the present disclosure, where spinning actuated markers are present in a traffic light to indicate a state (e.g., color) of the light.
Figure 13:
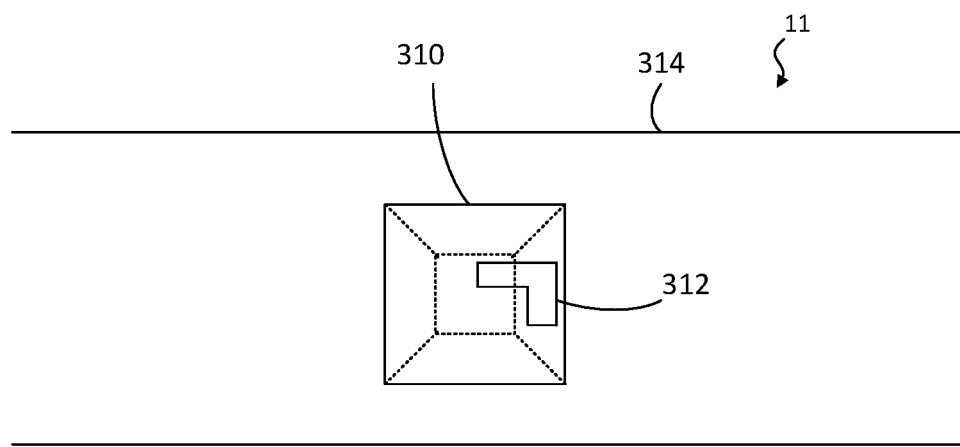
FIG. 13 is a schematic illustration of an exemplary embodiment of a radar-based information system of the present disclosure, where a radar reflective marker is embedded in a lane to convey unique and unambiguous information to a vehicle.

FIG. 1 depicts an exemplary embodiment of a radar-based information system 11 of the present disclosure. As shown by FIG. 1, the system 11 has radar reflective markers that are illustrated in a position to convey unique and unambiguous information to a vehicle equipped with a radar system. FIGS. 2-3 show components of the vehicle and a vehicle controller, respectively, for detecting, interpreting, and communicating information provided by the radar reflective markers. In FIGS. 4-10, the number, shape or shapes, and spatial relationship among the reflective markers or marker elements provide a unique radar signature that may be interpreted as coded information. FIG. 11 illustrates how radar reflective markers may be utilized through multilateration or other algorithms for determining the local position of a vehicle. FIG. 12 shows an embodiment of the present disclosure with an actuated spinning marker located within a traffic signal to provide traffic direction and signaling information through radar detection. In FIG. 13, another embodiment of the present disclosure includes radar reflective markers that are embedded in or on lane reflectors to provide lane location and vehicle positioning information.

As known in the art, the term "radar," which is also sometimes referred to as R.A.D.A.R or RADAR, refers to radio detection and ranging. Radar generally uses electromagnetic waves, such as radio waves, to detect objects and determine properties of the detected objects including, but not limited to, distance, angle, frequency, or velocity.

Referring to FIG. 1, radar reflective markers 10 are shown to be positioned proximate a roadway 22, such as along a side or shoulder of the roadway 22. However, markers 10 may be positioned in any location potentially detectable by a radar system 14, such as radar system 14 on a radar-equipped vehicle 12. Thus, markers 10 may be placed, either temporarily or permanently, proximate an intended path or trajectory of vehicles, including (but is not limited to) paved or unpaved paths, roadways, and parking locations or structures. Locations for markers 10 further include locations near, on, or in place of traffic signals, traffic signs or indicators, mile markers, infrastructure indicators, or other marking indicators or structures. In some instances, one or more markers 10 may be positioned relative to another object to indicate its position, as is discussed below in greater detail. In some instances, markers indicate lanes 24, 26, lane boundaries, or vehicle lane position relative boundaries such as road boundaries 30, 32 or a centerline 28, as is discussed below in greater detail.

Markers 10 are configured to be detectable using radar technology, and as such may be detectable in situations when visual detection systems are impaired. Such situations include inclement weather, such as snow cover, and low light conditions. Radar system 14 on vehicles 12 include a radar 15 with a radar transmitter 16 for transmitting electromagnetic waves, such as radio waves. Transmitted waves then encounter and reflect from objects in their proximity. According to the present disclosure, radar reflective markers 10 are configured to reflect transmitted waves back to vehicle 12 and for reception by a radar receiver 18 of radar 15, conveying a unique radar signature that identifies the object as a specific marker 10 (e.g., a marker 10 of a specific location or a marker 10 of a specific type), and in some cases the unique radar signature has encoded information that may provide a message corresponding to the marker 10. A controller 17 within radar system 14 may be used to determine object characteristic information. Notably, the information conveyed by a given marker 10 may be predefined or dynamically changed. Regardless of the type of information conveyed, the markers 10 may be differentiated from other objects detected by the radar system 14 by the unique radar signature of markers 10. Information conveyed to the vehicle by one or more of the markers 10 may be transmitted to a vehicle controller 20 for further interpretation, storage, communication, and/or direction of responsive actions.

Note that the controller 17 within the radar system 14 may be implemented in hardware or a combination of hardware with software and/or firmware. As an example, the controller may comprise one or more field programmable gate arrays (FPGAs) or application-specific integrated circuits (ASICs). In some embodiments, the controller 17 has software that is executed by one or more processors (not specifically shown) of the controller 17.

FIG. 2 depicts various components of the vehicle 12 depicted by FIG. 1, including a vehicle controller 20 that may be used to react to the information conveyed by one or more markers 10. The vehicle controller 20 may receive information regarding the vehicle's environment, operation, location, and other parameters from vehicle system controllers 21, as well as from sensors 34, cameras 36, and radar system 14. Vehicle system controllers 21 include, for example, engine controllers 38 for managing the operation of and communicating with engine 40, brakes controller 42 for managing the operation of and communicating with brakes 44, and steering controller 46 for managing the operation of and communicating with steering system 48. Vehicle controller 20 further communicates with cameras 36, sensors 34, and radar system 14 for the assessment of the vehicle's environment. Applications for cameras 36 include those related to vehicle environment and location sensing, and rely on visual identification and interpretation of the vehicle's exterior environment. Cameras 36 may operate with or without other sensors 34 or radar system 14 to provide environmental and vehicular information. For example, a camera 36 may visually detect the boundaries of a lane 24 in which vehicle 12 is traveling, while radar system 14 detects the presence of an object within the trajectory of vehicle 12 in lane 24. The information provided by both camera 36 and radar system 14 may be provided to the vehicle controller 20 to be interpreted and used to control the velocity and thus location of the vehicle 12. Other sensors 34 include, but are not limited to, accelerometers, tachometers, speedometers, global positioning systems (GPS), light detecting and ranging (LIDAR) systems, temperature sensors, emission sensors, pressure sensors, and fluid level sensors.

In FIG. 2, the vehicle controller 20 further communicates with vehicle system controllers 21 to receive information about vehicle operations and to direct the systems which are controlled by vehicle system controllers 21. For instance, the vehicle controller 20 may direct engine controller 38 to alter operations of engine 40 (e.g., thrust generated by the engine 40), brakes controller 42 to initiate, stop, or change the operation of brakes 44, or steering controller 46 to alter the direction of the vehicle using steering system 48. In some instances, vehicle controller 20 directs more than one system to alter vehicle operations simultaneously or otherwise.

Further, in FIG. 2 radar system 14 serves to process signals encountered from the environment of vehicle 12 and to provide data characteristics of objects to vehicle controller 20 for interpretation. Such characteristics include object size, shape, orientation, elevation, and range, though other characteristics are contemplated by the present disclosure. In processing signals from the radar 15, the radar controller 17 may determine object location information based on a local coordinate system relative to the vehicle 12, which may be further coordinated with a global coordinate system by the vehicle controller 20 or the radar controller 17 to determine global positioning. The data characteristics may be interpreted by the vehicle controller 20 or radar controller 17, as described in greater detail below. In some instances, information regarding markers 10 is determined by the radar controller 17 based on raw radar data from the radar 14 and is used by the radar controller 17 to identify markers 10, while in other instances marker identification may be undertaken by the vehicle controller 20 using raw radar data from radar system 14.

In a preferred embodiment, radar system 14 processes signals encountered from the environment of vehicle 12 and identifies markers 10 within the environment of vehicle 12.

In radar system 14, radar controller 17 is configured to communicate with other elements within radar system 14, such as transmitter 16 and receiver 18. Radar controller 17 includes control logic that is implemented in software, as well as a processor configured to retrieve and execute instructions from the control logic to perform the functions ascribed herein to the radar controller 17. For instance, when raw data characteristics of an object or objects detected by radar system 14 are communicated to radar controller 17, radar controller 17 is configured to identify or reject the object or objects as a marker 10. This identification includes detection of object size, shape, location, number, or other characteristics indicative of a marker 10. Radar controller 17 receives raw radar data from the radar 15 and may use the raw radar data to determine the object's azimuth, elevation, range, Doppler, and micro-Doppler dimensions, which are interpreted by radar controller 17 to identify the object or group of objects as a marker 10 or other, non-marker object. Radar system 14 may communicate the identity of an object as a marker, as well as object characteristics of azimuth, elevation, range, Doppler, and micro-Doppler dimensions, to vehicle controller 20 for further calculations or identifications, as described below in greater detail.

FIG. 3 depicts an exemplary embodiment of the vehicle controller 20. The exemplary vehicle controller 20 depicted by FIG. 3 comprises control logic 54 that is configured to control the vehicle controller 20. The control logic 54 may be implemented in hardware, software, or any combination thereof. In the exemplary embodiment, depicted by FIG. 3, the control logic 54 is implemented in software and stored in memory 52 of the controller 20. However, other configurations of the control logic 54 are possible in other embodiments. The control logic 54 may be configured to process data from one or more sensors or vehicle systems, calculate or determine values or parameters from the data, store information in memory 52, and process information from the radar system 14 (FIG. 2), as will be described in more detail below.

As shown by an embodiment in FIG. 3, the vehicle controller 20 may have at least one processor 50 configured to communicate with and drive other elements within the controller 20 via at least one bus. As an example, the processor 50 may be a digital signal processor (DSP), central processing unit (CPU), or any instruction execution apparatus that is configured to retrieve and execute instructions from memory 52. As an example, when the control logic 54 is implemented in software, the processor 50 may be configured to retrieve and execute instructions from the control logic 54 to perform the functions ascribed herein to the vehicle controller 20. For instance, when raw data characteristics of an object or group of objects detected by radar system 14 are communicated to vehicle controller 20, control logic 54 may be implemented to identify or reject the object or group of objects as a marker 10. Further, control logic 54 may determine that the characteristics of a marker 10 convey a unique signature corresponding to an entry or entries in memory 52. Further still, control logic 54 may determine a message that is encoded by the marker 10, such as a warning, an identifier (e.g., marker or location identifier), notification, or other type of message. Note that in some instances, the encoded message may be a pointer that can be used to retrieve information from a database or other type of memory, such as a warning, an identifier, a notification, or any other type of information described herein.

As shown by FIG. 3, marker data 53 may be stored in memory 52 and used by the control logic 54. The marker data 53 includes information related to the markers such as marker identifiers, marker locations, or other messages to be conveyed by the markers. For example, the marker data 53 may store an identifier of each marker in a particular region that a vehicle 12 may encounter. As an example, as the vehicle 12 enters a certain geographic region, the marker data 53 corresponding to that region may be downloaded from a remote server and stored in memory 53 for use while the vehicle 12 remains in that region. In some embodiments, the marker data 53 correlates each marker identifier within information indicative of the radar signature expected for the identified marker. Thus, upon detecting a signature of a given marker, the marker data 53 may be consulted to determine the marker identifier that is correlated with the signature.

In some embodiments, other types of information may be correlated in the marker data 53 with the marker identifier or the information indicative of the radar signature. As an example, a predefined message may be correlated with the marker identifier or signature. Thus, upon identifying a marker or its signature, the marker data 53 may be used to lookup a message to be conveyed by the marker. In some cases, the location of the marker may be correlated with the marker identifier or signature. Thus, upon identifying a marker or its signature, the marker data 53 may be used to lookup the marker's location. Such location may be indicated by coordinates, such as latitude and longitude, or other types of location information. Various other information about the markers may be indicated by the marker data 53 in other embodiments.

Note that in some embodiments, the radar system 14 may provide raw radar data to the vehicle controller 20, which analyzes the radar data to determine radar signatures and to compare the radar signatures to the marker data 53 to identify the markers that produced the signatures and/or messages associated with the signatures. In other embodiments, the controller 17 of the radar system 14 may be configured to process the raw radar data and to provide information indicative of the detected signatures, messages associated with the signatures, or identifiers of the markers that produced the signatures. Notably, the functions of processing and analyzing radar data may be performed by or distributed across the vehicle controller 20 and/or the radar controller 17 as may be desired. Specifically, any functions described herein as being performed by the vehicle controller 20 may be perform instead by the radar controller 17, and any function described herein as being performed by the radar controller 17 may be performed by the vehicle controller 20. Further, any number of controllers may be used to perform such processing and analysis. As an example, a single controller may receive raw radar data from the radar 15, process the raw radar data to determine information about objects in the environment, identify markers, and control the vehicle based on the identified markers.

In FIG. 3, a data interface 56 is provided to receive inputs from and convey outputs to systems and devices within vehicle 12. As an example the data interface 56 may be communicatively coupled (wired or wirelessly) to the sensors 34, camera 36, vehicle system controllers 21, and the radar system 14 depicted by FIG. 2, thereby enabling the controller 20 to communicate with any of these vehicle components. The controller 20 may also have a display device 57, such as a liquid crystal display (LCD), for displaying information. As an example, the controller 20 may display messages conveyed from one or more markers or otherwise determined from the conveyed information to occupants of the vehicle 12. For example, speed limit information, road hazard information, or other information pertinent to the operation of the vehicle 12 may be displayed to an occupant, such as a driver of the vehicle 12.

Figure 4:
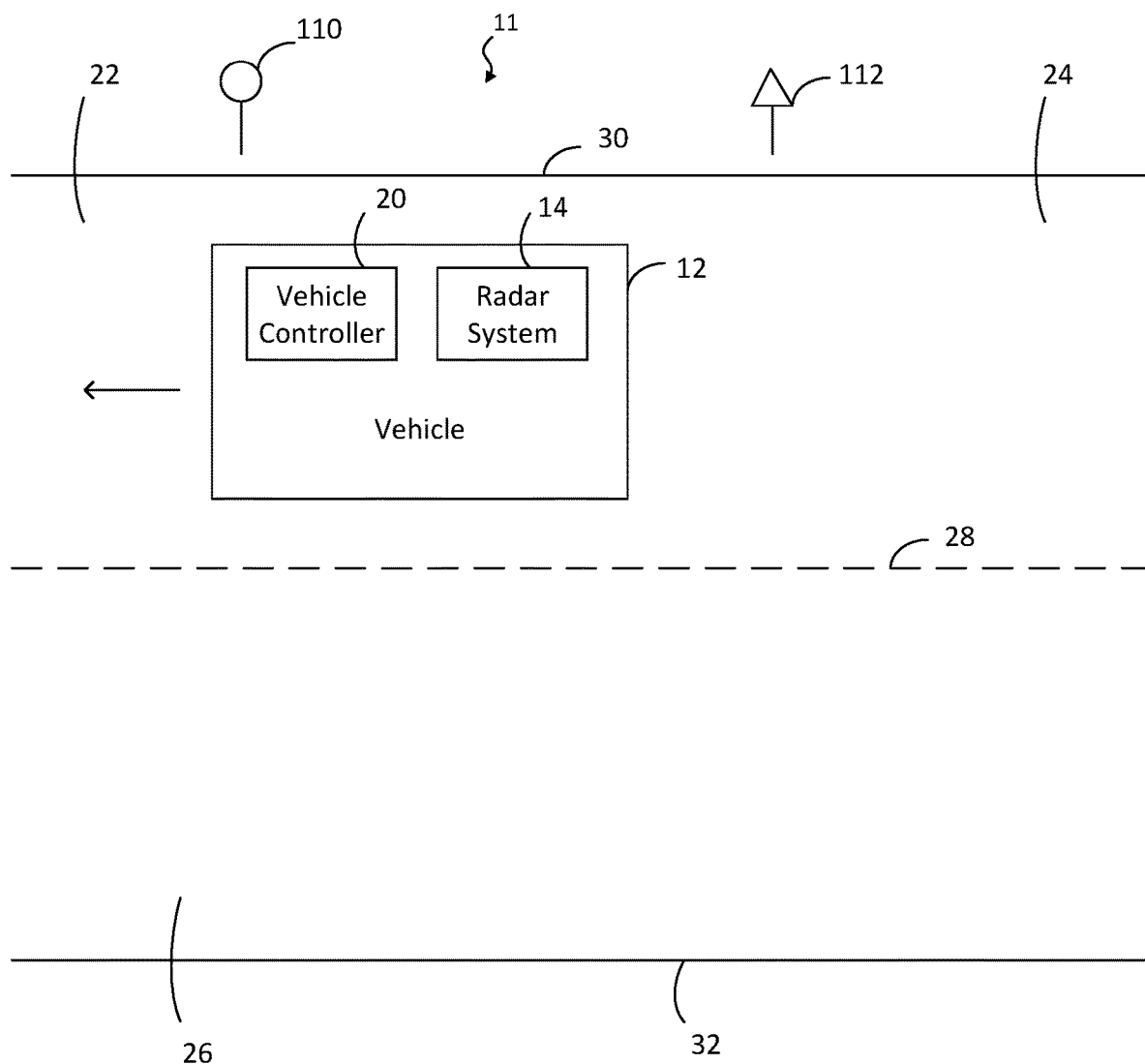
FIG. 4 is a schematic illustration of an exemplary embodiment of a radar-based information system of the present disclosure, where a characteristic of marker shape conveys unique and unambiguous information to a vehicle.

Referring to FIG. 4, the vehicle 12 is positioned to detect unique radar signatures corresponding to multiple markers 10, such as a first marker 110 and a second marker 112. In the depicted embodiment, the markers 110 and 112 have different shapes, which correspond to unique identities and radar signatures. However, as described in greater detail below, other characteristics of markers 10 may be used to provide unique signatures and encode distinct information. Different types of marker characteristics, such as shape, location, distance or spacing from other markers, number of reflective elements, relative positions of reflective elements, actuated speed, and actuated frequency, may be used to convey distinct encoded information. The encoded information from markers 10 may include a pointer to one or more database entries, where the one or more database entries may include any information suitable for use in a system incorporating one or more of the radar markers. In some instances, more than one marker characteristic may be used to convey more than one type or encoded information. In some instances, more than one marker 10 is used to convey encoded information.

In a non-limiting example of marker characteristics for conveying encoded information, marker shape and orientation may be used to convey traffic regulations, such as a speed limit. In such an exemplary situation, a triangular shaped marker 112 may be recognized as corresponding to speed limits based on the marker shape. Further, the pattern or orientation of the triangle of marker 112 may convey the numerical value of the speed limit, such as a vertex facing downward indicating a value of 25 miles per hour or a vertex facing upwards indicating a value of 65 miles per hour. In this example, radar system 14 detects marker 112 and its characteristic shape, size, and orientation and provides this information as raw data to vehicle controller 20. From the raw data, vehicle controller 20 implements control logic 54 to recognize marker 112 as a marker and to identify the unique signature provided by marker 112, and then looks up all corresponding information from memory 52 related to the identified unique signature.

Additional non-limiting examples of the encoded information or the database entries may include a surveyed location, a specific location, structure, or other object along a thoroughfare, including a roadway, bridge, or tunnel, one or more of a distance and direction to an object, coordinates of the marker or an object in Earth Centered Earth Fixed (ECEF) reference frame.

The disclosed radar markers 10 may be utilized by radar system 14 with sufficient resolution in one or more of azimuth, elevation, range, Doppler, and micro-Doppler dimensions to discern the spatial information provided by the reflector elements in the same one or more dimensions. Alternately, radar markers 10 may be configured with a particular spacing in one or more of azimuth, elevation, range, Doppler, and micro-Doppler dimensions that allows the radar with a particular resolution in the same one or more dimensions to discern the spatial information provided by the reflector elements. In embodiments with a higher resolution radar, the marker spacing may be relatively smaller, while in embodiments with a lower resolution radar, it may be desirable for the marker spacing to be relatively larger to allow the radar system 14 to discern the desired characteristics for conveying information.

An example of a radar system 14 that may be used with the vehicle 12 is a 2-D MIMO sparse array system with a sparse array selected to minimize interpolation error of Doppler signals at virtual and missing array elements, which receives a Range-Doppler bin of radar return signals from one or more radar markers 10. The exemplary system estimates signals at virtual and missing 2D array elements, processes the signals at the virtual positions, obtains optimal estimates of principle target scatterers in elevation, azimuth, angles, and power, and renders and displays an ultra-high angle resolution of Doppler features of the one or more radar markers 10. The features may be analyzed and compared to a database of known features, or may be interpreted to realize the information encoded in the return signals. Further, the 2-D MIMO sparse array system provides at least an order of magnitude improvement in resolution of detected objects, allowing markers 10 to be recognized with smaller sizes than would be possible with other radar systems. Smaller markers 10 may result in a reduction in marker costs, permitting radar-based information system 10 to be implemented at a significantly lower cost. Exemplary 2-D MIMO sparse array systems are described in commonly-assigned U.S. application Ser. No. 17/375,994, entitled "Methods and Systems for Processing Radar Signals" and filed on Jul. 14, 2021, which is incorporated herein by reference. In other embodiments, other types of radar may be used.

Referring again to FIG. 4, marker shape, as indicated by the circular shape of marker 110 and triangular shape of marker 112, may be used to convey a unique radar signature for each marker 110, 112. For example, radar system 14 detects marker 110 to have a unique signature based on its circular shape, which may indicate that the marker 110 represents or defines a mile marker or position along roadway 22, while it detects marker 112 to have a different radar signature based on its triangular shape, which may indicate that the marker 112 represents or defines a speed limit for roadway 22. When marker 112 represents a speed limit, speed values may be further indicated by the size of marker 112, with particular sizes representing particular speed values. Other potential encoded information includes, but is not limited to road construction status, infrastructure locations, hazard information, weather information, mile markings, location information, speed limits, or other road, vehicle, or environment characteristic.

Figure 5:
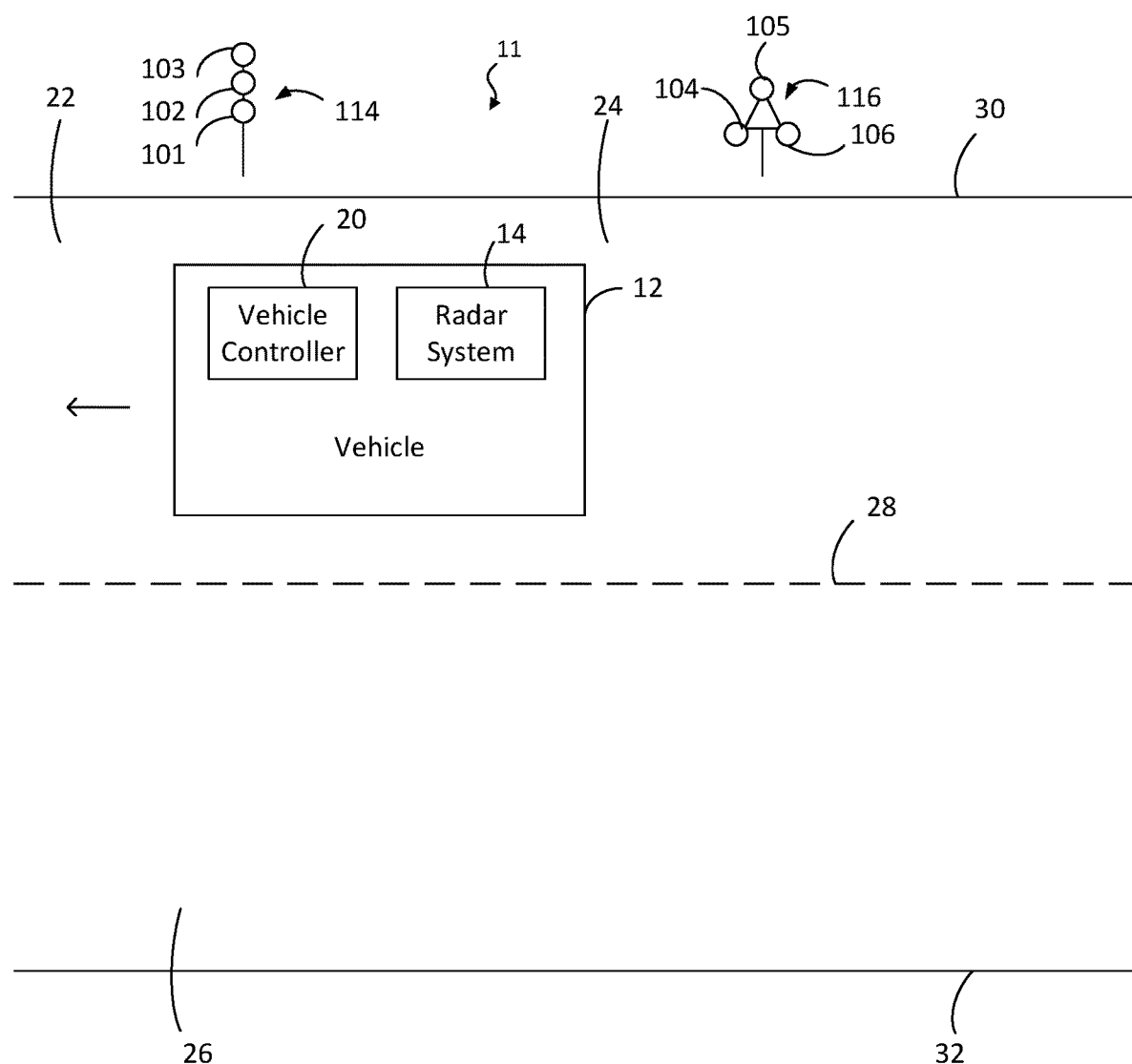
FIG. 5 is a schematic illustration of an exemplary embodiment of a radar-based information system of the present disclosure, where a characteristic of marker spatial configuration conveys unique and unambiguous information to a vehicle.

Referring to FIG. 5, reflector elements are included with a unique spatial pattern to provide a unique radar signature for markers 114 and 116. As an example, the multi-element marker 114 shown by FIG. 5 has three elements 101-103, and the multi-element marker has three elements 104-106. Each element 101-106 has a unique shape to facilitate identification of the element from other objects that may be in the environment. In the exemplary embodiment shown by FIG. 5, each element 101-106 has a circular shape with a predefined diameter and is spaced apart from the other elements of the same marker within a predefined range. As an example, each element 101-103 of marker 114 may be spaced from the next adjacent element 101-103 of the same marker 114 by no more than a threshold distance (e.g., about three inches). Thus, if the radar system 14 determines that a signature indicates that there are multiple circular objects of the predefined diameter that are positioned within at least a threshold distance of each other, then the radar system 14 may determine that the objects represent elements 101-103 of an encoded marker. Thereafter, the radar system 14 may analyze the spatial arrangement of the elements 101-103 or other characteristics of the marker to determine information conveyed by the marker. Note that FIG. 5 shows each marker 114 and 116 as having three elements, but a multi-element marker may have any number of elements in other embodiments.

As indicated above, after having identified a marker 114 or 116, the radar system 14 may analyze the spatial arrangement of its elements in order to decode information from the marker. As an example, the elements 101-103 of marker 114 are arranged in a straight line, whereas the elements 104-106 of marker 116 are arranged in a triangular pattern. The unique spatial pattern of marker 114 (i.e., three elements in a straight line) may convey certain information, and the unique pattern of marker 116 (i.e., three elements in a triangular pattern) may convey different information. Thus, by identifying the spatial pattern of the elements of a given marker, the radar system 14 can determine the information that is conveyed by the marker.

As an example, each spatial pattern may be unique to and indicate a marker type, such as a certain type of roadside sign. For example, the spatial pattern defined by the marker 114 may correspond to a stop sign indicating that the vehicle 12 should temporarily come to a stop at or near the marker 114, whereas the spatial pattern defined by the marker 116 may correspond to a yield sign indicating that the vehicle 12 should yield to other traffic at or near the marker 116. Various other marker types are possible in other embodiments. As an example, the spatial pattern of a marker may indicate that a hazard (e.g., a traffic accident, construction zone, or sharp turn) is close to the marker or is down road from the marker a short distance (e.g., 500 feet), thereby warning the driver of vehicle 12 or the vehicle controller 20 of the hazard so that appropriate action can be taken (e.g., decrease in speed).

In some embodiments, the spatial pattern of a marker may indicate only a portion of a message. As an example, multiple markers may be used to convey a message where each marker represents a portion, such as a digit, character, word, or phrase, of a message. As an example, the two markers 114 and 116 may form a speed limit message to convey the speed limit for the area in which the markers 114 and 116 are located. In such example, the marker 116 may convey a numerical value or digit (e.g., "6") and the marker 114 may convey another numerical value or digit (e.g., "5") such that a certain speed limit (e.g., 65 miles per hour) is conveyed by the two markers 114 and 116. In such example, the proximity of the markers 114 and 116 relative to one another may indicate that they are part of the same message. As an example, the radar system 14 may be configured to determine that two consecutive markers that are less than a threshold distance from each other are part of the same message. Other techniques for utilizing unique spatial patterns to convey information are possible in other embodiments.

Figure 6:
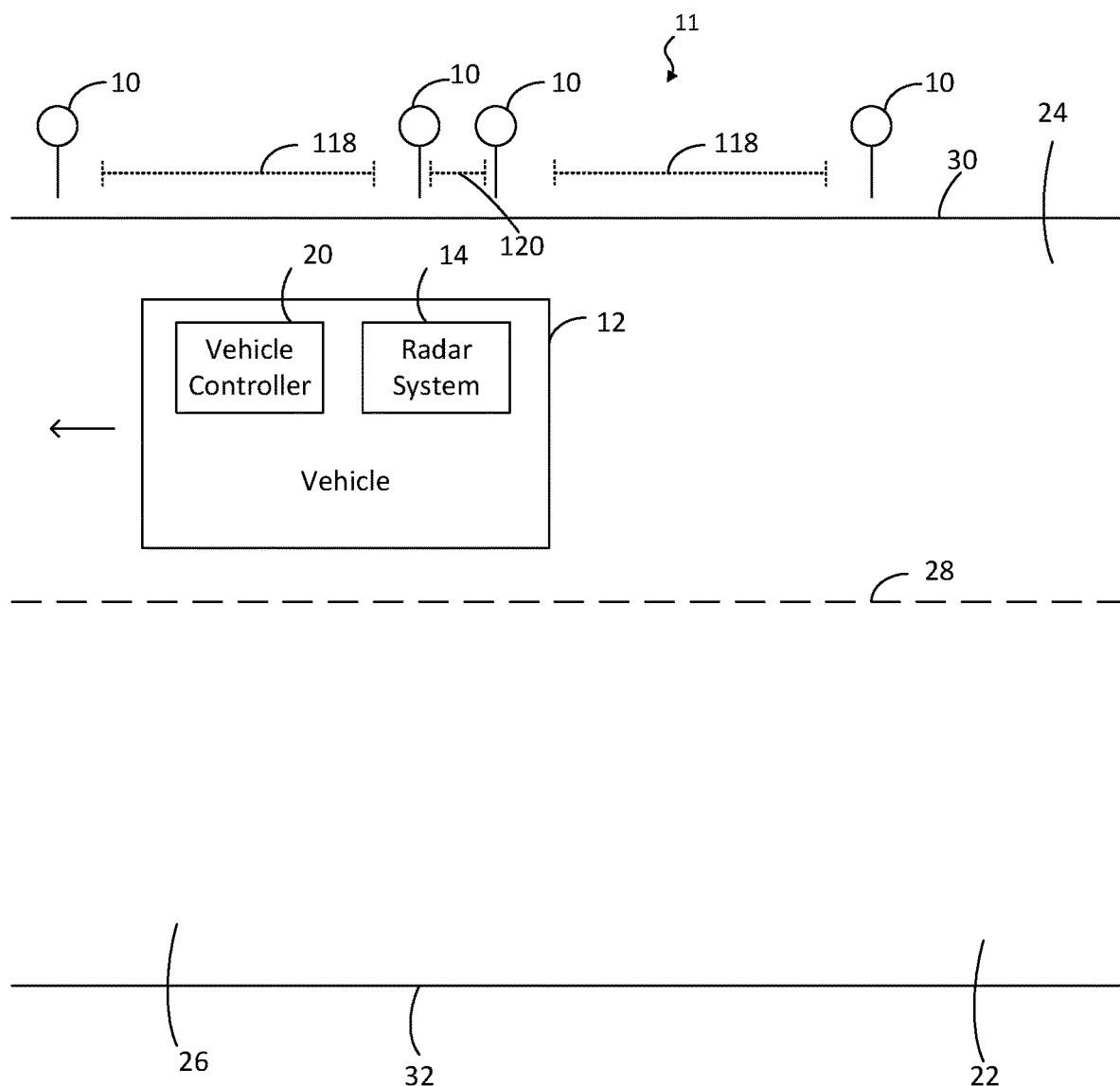
FIG. 6 is a schematic illustration of an exemplary embodiment of a radar-based information system of the present disclosure, where a characteristic of marker spacing conveys unique and unambiguous information to a vehicle.

In FIG. 6, markers 10 include different spacings 118, 120, which convey unique radar signatures and distinct information from the markers 10. Markers 10 are detected by radar system 14 and their local position is determined. Vehicle controller 20 then determines spacings by recognizing each object or group of objects as a marker and, through control logic 54, recognizes spacing between each marker 10 as a unique signature. Thus, spacings of one length may correspond to first information, while spacings of a second length may correspond to different information. Further, a group of objects may indicate several markers 10 with different spacings providing further information, or may identify a group of objects with a certain spacing or organization as indicating one marker having a particular signature.

In the example depicted in FIG. 6, larger spacing 118 provides a first encoded message or parameter, while smaller spacing 120 provides a second encoded message or parameter. The first encoded parameter may, for example, indicate a higher speed limit, while the second encoded parameter may indicate a lower speed limit. Thus, vehicle controller 20 receives information based on the spacings of markers 10 that allows for control of vehicle systems 21 or for communication of such information to a driver or passenger of vehicle 12.

In another non-limiting example, spacing between markers 10 may directly encode messages. Modulation of spacings may be undertaken to form a binary or other type of pattern, which is recognized using control logic 54. As an example, a larger spacing 118 may indicate a binary "1", while a smaller spacing 120 may indicate a binary "0". All marker spacings within a particular range may then be interpreted as a binary message that can indicate unique information, such as an alert to road or traffic conditions. The message may be used to access a predetermined stored in memory 52 (e.g., point to a database entry or other memory location where a predefined message is stored), or may define a new message encoded using binary (e.g., the binary pattern defines a new message being conveyed).

Figure 7:
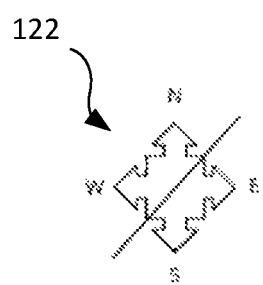
FIG. 7 is a schematic illustration of an exemplary embodiment of a radar reflective marker, such as is depicted by FIG. 1, where a directional-shaped marker conveys unique and unambiguous information to a vehicle.

In FIG. 7, directionally-shaped marker 122 is provided to convey information based on its shape. For instance, pointers may extend to specific cardinal directions, east, west, north, and south, and an indicator may be detectable on or between pointers to provide directional information to vehicle 12.

Now referring to FIGS. 8A-8D, actuated markers 124 and 132 are depicted, respectively. In both depicted examples, markers 124 and 132 are driven by an actuator 130, which provides motion that is interpreted as a unique radar signature. Actuator operation is described in more detail below. Actuation includes the movement of one or more elements 128, 136 about a point of rotation, such as by the movement of arms 126, 134. Movement may include full rotation about a point of rotation or rotation within a range of angles about a point of rotation. Movement includes increases or decreases in speed or velocity, or changes in rotational direction. Actuation may further include a cessation of motion of elements 128, 136. Elements 128, 136 are depicted as circular and as attached to arms 126, 134 that pivot about a central point of rotation in FIGS. 8A-8D, though other element and arm shapes, sizes, lengths, numbers, and positions are compatible with the present disclosure.

Figure 10:
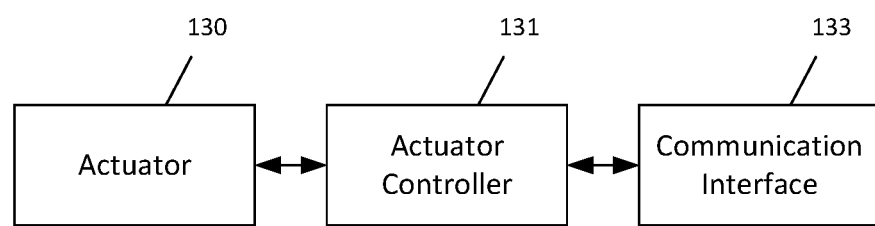
FIG. 10 is a block diagram illustrating components of actuated markers of FIG. 8A, FIG. 8B, FIG. 8C, and FIG. 8D, where a characteristic of marker frequency or speed conveys unique and unambiguous information to a vehicle.

FIG. 10 depicts components of an actuator marker in greater detail. Actuator 130 is attached to moving elements of an actuator marker either directly or indirectly, such as to arms 126, 134. An actuator controller 131 communicates with actuator 130 and with a communication interface 133. Controller 131 receives information to communicate via marker actuation from communication interface 133, which may allow a user to transmit a message locally at the marker or remotely using wireless communication. Thus, actuator markers are capable of receiving a message from a remote location (e.g., a remote server) and delivering the message to one or more vehicles. The message may be updated or changes as may be desired. After a message is provided by the communication interface 133, actuator controller 131 directs actuator 130 to impart a corresponding motion or pattern of motion to convey the message. Thus, different element positions, rotational frequencies, rotational directions, or other actuated characteristics are adjusted by actuator 130 to convey a message, such as an encoded message or unique signature.

Figure 8A:
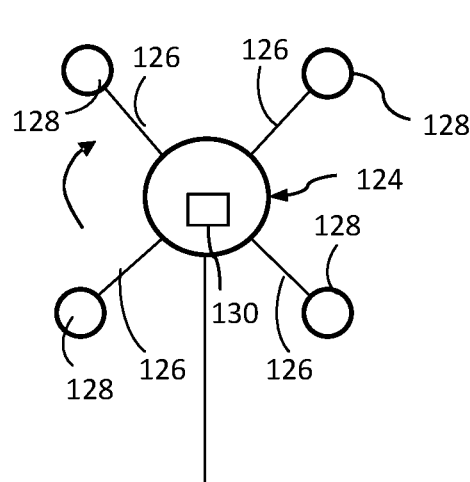
FIG. 8A is a schematic illustration of an exemplary embodiment of radar reflective markers, such as are depicted by FIG. 1, where a characteristic of marker spinning frequency or speed conveys unique and unambiguous information to a vehicle.
Figure 8B:
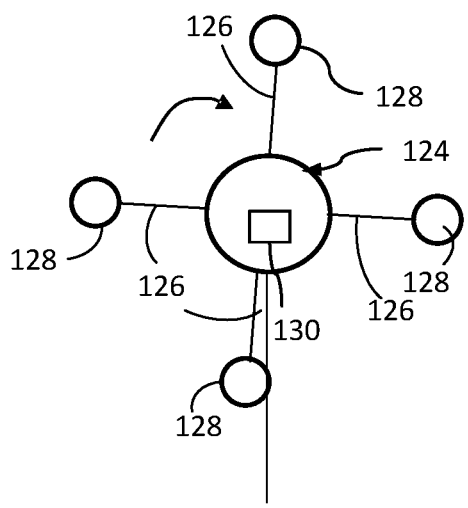
FIG. 8B is a schematic illustration of an exemplary embodiment of radar reflective markers, such as are depicted by FIG. 1, where a characteristic of marker spinning frequency or speed conveys unique and unambiguous information to a vehicle. Marker element position has rotated relative the position in FIG. 8A.

In the exemplary embodiment depicted in FIG. 8A, actuator marker 124 has arms 126 that extend from the marker 124 and are attached to elements 128. When actuator 130 drives actuator marker 124, arms 126 with elements 128 rotate about a central point of rotation at a frequency and in a direction that is detectable using radar system 14. FIG. 8A shows the marker 124 in a first orientation, and FIG. 8B shows the marker 124 after the elements 128 have been rotated clockwise by an amount. The radar system 14 is configured to recognize element position and changes in position over time, which vehicle controller 20 interprets as a unique signature or encoded message. For instance, frequencies may be sampled over a period of time, such as every half second or tenth of a second. When frequencies change over the sampling period, a message or portion of a message may be provided and interpreted using control logic 54 or entries in a database in memory 52. While arms 126 are depicted in FIG. 8A, actuator marker 124 is contemplated to have different reflector elements in embodiments not depicted, such as blades, spokes, rotors, or other rotatable or moveable elements. As actuator 130 imparts motion, the motion is implemented at specific times in some instances, is constant in some instances, or is periodic over time in other instances. For rotating motion, the frequency is constant in some instances or variable in other instances.

Figure 9A:
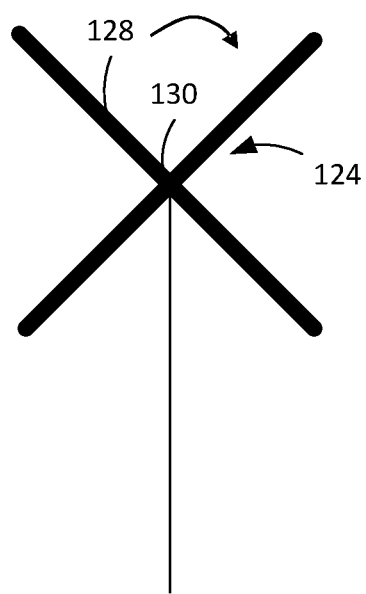
FIG. 9A is a schematic illustration of an exemplary embodiment of radar reflective markers, such as are depicted by FIG. 1, where a characteristic of marker spinning frequency or number of blades conveys unique and unambiguous information to a vehicle.
Figure 9B:
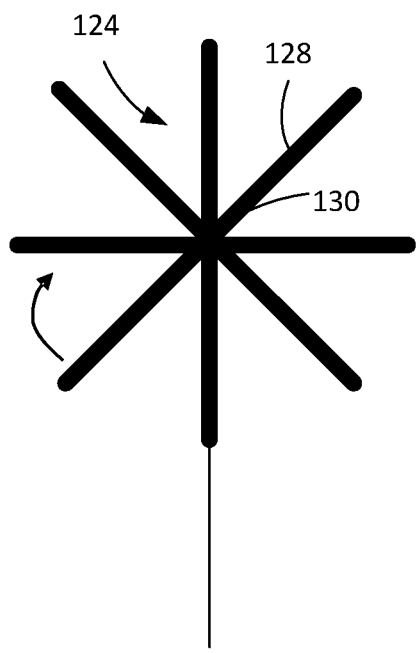
FIG. 9B is a schematic illustration of an exemplary embodiment of radar reflective markers, such as are depicted by FIG. 1, where a characteristic of marker spinning frequency or number of blades conveys unique and unambiguous information to a vehicle. Marker element position has rotated relative the position in FIG. 8A.

In some embodiments, such as the embodiment depicted in FIGS. 9A and 9B, the actuator 130 serves as an actuator marker 124, where characteristics such as the number of elements 128 or speed of rotation convey information to radar system 14. In the example depicted in FIG. 9A, there are four elements 128 on actuator marker 124, while in FIG. 9B there are eight elements 128 on actuator marker 124. The radar controller 17 of the radar system 14 may be configured to count the number of elements 128 on a given marker and use such information as input indicating a parameter of the marker, such as marker type. Also, the radar controller 17 may be configured to determine the speed or rotational frequency of the elements 128 and use such information as input indicating another parameter, such as a data value or other type of information. For example, in FIG. 9A, the four elements 128 may indicate that actuator marker 124 represents a traffic signal, where speed or rotational frequency of actuator marker 124 indicates a red, yellow, or green traffic light. In FIG. 9B, the eight elements 128 may, for example, indicate that actuator marker 124 represents a speed limit, where a speed or rotational frequency of actuator marker 124 indicates a speed limit value.

In some embodiments, the rotational frequency or other movement speed or direction may be modulated to convey an encoded signal. For example, a rotational frequency or speed above a predetermined threshold may be determined to convey a binary "1" value, where a frequency below the predetermined threshold may be determined to convey a binary "0" value. Thus, the frequency or other movement speed may be modulated over time to convey a stream of binary values, which encodes a message, value, or parameter that is interpreted by vehicle controller 20. For example, frequency modulation may be used to convey a binary message of 00 for the color red, 01 for the color yellow, and 10 for the color green at a traffic signal.

In another example, the actuator 130 may encode information using the orientation of one or more elements 128. As an example, a bit or character may be encoded each sampling period by moving the elements 128 to a certain position for the sampling period. For example, the orientation shown by FIG. 8A may represent a binary "0" and the orientation shown by FIG. 8B may represent a binary "1". For a given sampling period for a bit, the actuator 130 may move the elements 128 to the appropriate orientation to convey the desired bit value.

Figure 8C:
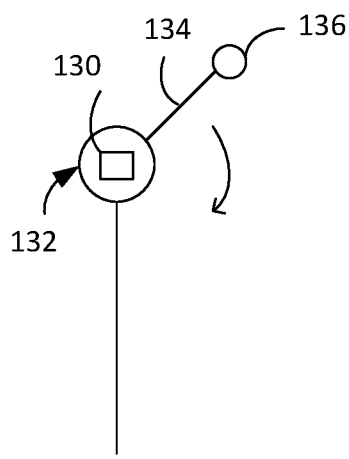
FIG. 8C is a schematic illustration of an exemplary embodiment of radar reflective markers, such as are depicted by FIG. 1, where a characteristic of marker rotating frequency or speed conveys unique and unambiguous information to a vehicle.
Figure 8D:
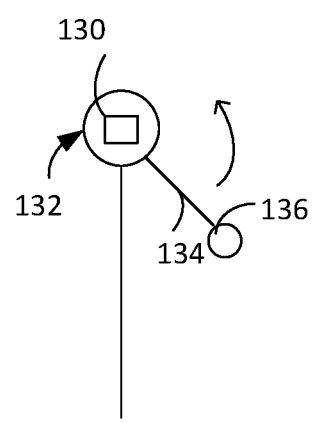
FIG. 8D is a schematic illustration of an exemplary embodiment of radar reflective markers, such as are depicted by FIG. 1, where a characteristic of marker rotating frequency or speed conveys unique and unambiguous information to a vehicle. Marker element position has rotated relative the position in FIG. 8C.

In FIG. 8C, actuator marker 132 has an arm 134 that extends and connects to an element 136. While one arm 134 and element 136 is depicted, more than one arm 134 and element 136 is compatible with the present disclosure. When actuator 130 drives actuator marker 132, arms 134 with elements 136 rotate or move at a velocity or frequency that is detectable using radar system 14. FIG. 8C shows the marker 132 in a first orientation, and FIG. 8D shows the marker 132 after element 136 has been rotated clockwise by an amount. Radar system 14 further detects the position of elements 136 or the change in position of elements 136 over a sampling period. Rotation or motion modulates the position of one or more of rotating elements 136, where the velocity, acceleration, frequency and/or rotating element position provides a unique radar signature that is interpreted by vehicle controller 20. When velocity or frequency is a characteristic that conveys the unique radar signature, it may be done as described for actuator marker 124 in FIG. 8A. When position of elements 136 conveys the unique radar signature, radar system 14 is configured to interpret different rotating element positions, elevations, azimuths, or ranges as corresponding to different unique radar signatures that impart different encoded messages or parameters.

For example, in FIG. 8C, a raised element 136 may indicate one situation, while a lowered element 136 as in FIG. 8D may indicate another situation. This may indicate that when element 136 is raised, road work is ongoing and a lower speed limit is in force, while when element 136 is lowered, no road work is occurring and a higher speed limit is indicated. In another instance, the arm 134 may be utilized to move element 136 at a frequency or frequencies, which may be interpreted as described above for actuator marker 124 in FIG. 8A.

Referring now to FIG. 11, a radar-based information system 11 for localization using localization markers 138, 140, and 142 is depicted. The radar-based information system 11 includes one or more markers 138, 140, and 142, that are positioned such that vehicle 12 with radar system 14 is capable of detecting reflected radio waves and interpreting unique radar signatures for each marker 138, 140, and 142. In the depicted embodiment, three markers 138, 140, and 142 are shown, though more or less markers with different shapes, sizes, reflective elements, positions, spacings, or configurations are contemplated by the present disclosure. The depicted embodiment shows first location marker 138 and second location marker 140 on a side of roadway 22 closest to first road boundary 30, and third location marker 142 closest to second road boundary 32, though other locations and positions of markers not depicted are contemplated by the present disclosure.

When vehicle 12 is proximate markers 138, 140, and 142, radar system 14 receives characteristic information for each marker, which includes a unique radar signature for each marker. The unique radar signature is interpreted by vehicle controller 20 to convey a distinct encoded message for each marker 138, 140, and 142, where the encoded message is, in some instances, an identification and/or geolocation of each marker 138, 140, and 142.

As an example, as noted above, the marker data 53 may store information correlating each marker with its respective location, such as the marker's coordinates (e.g., latitude and longitude) within a predefined coordinate system. Based on the radar returns from the markers 138, 140, and 142, the vehicle controller 20 may be configured to identify each marker 138, 140, and 142 using the techniques described above and then use the marker data 53 to determine each marker's location within the predefined coordinate system. Based on other information gleaned from the returns, such as the range, azimuth, and elevation of each marker 138, 140, and 142 relative to the vehicle 12, the vehicle controller 20 may determine the vehicle's location relative to the locations of the markers 138, 140, and 142. The vehicle controller 20 may then use known algorithms, such as trilateration, triangulation, or multilateration to determine the vehicle's location within the predefined coordinate system, as will be described in more detail below.

In other embodiments, other techniques may be used to determine the vehicle's location. As an example, a given marker 138, 140, and 142 may be configured to convey a message that includes at least one numerical value representing a distance of the marker from a reference point. For example, the value may indicate the marker's distance from a shoulder or a centerline or boundary line of the roadway or lane on which the vehicle 12 is traveling. Using this information as well as the marker's distance from the vehicle 12, the vehicle controller 20 may determine the vehicle's location from the reference point.

In some instances, the encoded message may be an identification and/or geolocation of an object corresponding to each marker 138, 140, and 142. Such an object is, for example, a piece of equipment, a vehicle, a structure, infrastructure, a pipeline, a natural feature, a material, or another identifiable object. As an example, a marker 138, 140, or 142 corresponding a particular object may be positioned in close proximity to such object in order to mark the approximate location of that object. Such marker may convey an identification of or other information corresponding to the object such that, by locating the marker, the location of the object is known or determinable. In some instances, an object identified using markers 138, 140, and/or 142 may be visibly obscured or hidden such that locating the object without use of the corresponding marker may be difficult, (e.g., when the object is covered in snow or located underground). For example, the approximate location of a hidden underground water pipeline may be indicated by a corresponding marker 138, 140, or 142 so that large vehicles, such as mining trucks, avoid damage to the pipeline. In another example, a piece of snow clearing equipment that is left on a side of a roadway may be identified even when obscured with snow so that it may be relocated and retrieved. Locations of markers and nearby objects may be understood by a vehicle controller 20 to be relative to a known coordinate system, such as a global positioning system indicating latitude and longitude.

To better illustrate some of the concepts described above, assume that it is desirable for the markers 138, 140, and 142 to be used to determine the location of the vehicle 12 within a predefined coordinate system. For illustrative purposes, assume that this predefined coordinate system, referred to hereafter as "local coordinate system," is relative to a stationary reference point or origin. Thus, the locations within such local coordinate system of various stationary objects, such as the road, lanes, roadway exits, bridges, etc. may be known. In addition, the locations (e.g., coordinates) of the markers 138, 140, and 142 within this local coordinate system may be known and stored in the marker data 53.

Further assume that the vehicle 12 is traveling at a location where it receives returns from the markers 138, 140, and 142. Based on the returns, the radar system 14 can determine the location of each marker 138, 140, and 142 relative to the radar system 14 and, thus, the vehicle 12. As an example, the radar system 14 can determine the range, azimuth and elevation of each marker 138, 140, and 142 and communicate this information to the vehicle controller 20. In addition, the radar system 14 may also communicate sufficient information about the signatures from the markers 138, 140, and 142 such that the vehicle controller 20 can identify each marker 138, 140, and 142. Using the marker data 53, the vehicle controller 20 can determine the location of each identified marker 138, 140, and 142 within the local coordinate system. In this regard, as described above, the vehicle controller 20 may identify each marker 138, 140, and 142 based on its respective radar signature, which is unique to that marker. After identifying each marker 138, 140, and 142, the vehicle controller 20 may analyze the marker data 53 to determine the coordinates or other location information of each identified marker 138, 140, and 142 within the local coordinate system. Knowing the locations of the markers 138, 140, and 142 within the local coordinate system and the vehicle's location relative to the markers 138, 140, and 142, the vehicle controller 20 may then use trilateration, triangulation, multilateration, or other algorithm to determine the vehicle's location (e.g., coordinates) within the local coordinate system.

For example, in the depicted embodiment, the distance between vehicle 12 and marker 138 is shown as first radius 144, the distance between vehicle 12 and marker 140 is shown as second radius 146, and the distance between vehicle 12 and marker 142 is shown as third radius 148. In this example, multilateration may be used by the vehicle controller 20 to determine the vehicle location 150 within the local coordinate system from radii 144, 146, and 142 and known marker locations within the local coordinate system. In embodiments not shown, angular dimensions detected by radar system 14 of each marker 138, 140, and/or 142 relative to the vehicle 12 may be used with a triangulation approach to determine vehicle location 150. Vehicle location 150, when determined using markers 138, 140, and/or 142 may be more accurate relative to locations determined using GPS. For example, local position or vehicle location 150 may be determined within an accuracy of just a few centimeters according to the disclosed localization system, though other margins are possible in other embodiments. Further, triangulation or multilateration using markers 138, 140, and/or 142 to determine a local position is possible in regions where satellite connectivity is reduced or insufficient for GPS functionality in vehicle 12.

In some embodiments, the vehicle controller 20 may use the vehicle's location within the local coordinate system to make a variety of control decisions and/or to determine or otherwise calculate parameters to be used in control decisions. As an example, by comparing the vehicle's location over time, the vehicle controller 20 may accurately detect the vehicle's instantaneous or average speed or determine the vehicle's position relative to another object such the vehicle's position within the roadway or lane, and proximity to an object or hazard within or near the vehicle's trajectory. In this regard, as noted above, the locations of various stationary objects, such as roads, lanes, exits, and roadside or roadway hazards may be known, and information indicative of such locations may be stored by the vehicle controller 20. As an example, the vehicle controller 20 may store a geographical map indicating the locations of these objects within the map. The vehicle controller 20 may be configured to compare the vehicle's determined location to the locations of the objects in the map to make various control decisions. As an example, the vehicle controller 20 may control the velocity of the vehicle 12 in order to navigate the vehicle 12 along the roadway or to avoid a hazard.

Note that the precision of the vehicle's location within the local coordinate system enables the vehicle controller 20 to make control decisions that may be not possible with less accurate systems, such as GPS. As an example, the vehicle controller 20 may precisely control the vehicle's location within a lane by comparing the vehicle's location to the location of the lane in the stored map. For example, the vehicle controller 20 may control the vehicle 12 such that the center of the vehicle 12 travels along the centerline of the lane or that the tires (or other vehicle component) are a precise distance from an edge of the lane or other reference point. In some embodiments, where the distance or location of a marker 138, 140, and 142 from a road or lane is known, the vehicle controller 20 may precisely position the vehicle 12 within the lane by controlling the vehicle's location from the marker. Various other techniques may be used to control the position of the vehicle 12 in a lane or on a roadway in other embodiments.

As described above, the vehicle controller 20, in some embodiments, initiates responses to information conveyed using radar reflective markers 10 and/or other sensor or vehicle system input. Responses include, for instance, directing vehicle systems to alter speed, vehicle position, or a combination thereof. Other responses include alerting passengers to a condition or parameter conveyed by markers 10. Other responses to information conveyed, at least in part, by markers 10 are contemplated by the present disclosure. In order to respond to such information, vehicle controller 20 is configured to communicate with system controllers 21 or other controllers not depicted in FIG. 2. Communication with system controllers 21 is, in some instance, direction to alter vehicle components, systems, or operation in response to information conveyed, at least in part, by markers 10.

For example, when the vehicle location 150 is determined by vehicle controller 20 from markers 138, 140, and/or 142, the local position may be determined with such precision that position within lane 24, position relative to road or lane boundary 30, 32, or position relative to centerline 28 is known. The vehicle controller 20 may be configured to identify when vehicle 12 is or is not in a desirable local position, and adjust vehicle position within lane 24 relative to road or lane boundary 30, 32 or to centerline 28 when a change to the local position is desired. As an example, in instances where markers 10 convey a message regarding a hazard or object impeding a vehicle's intended path, the vehicle controller 20 may be configured to direct vehicle 12 into another lane, when available, or to slow or stop vehicle 12 prior to impact with the hazard or object.

In some instances, the local positions of vehicles 12 within a lane may be controlled such that wear on the roadway is better distributed across the surface of the lane 24. In this regard, if a large number of autonomous vehicles are controlled to drive precisely along the centerline of a lane (e.g., where the center of the vehicle 12 travels substantially along the centerline), then it is likely that the tires of the vehicles will make contact with the lane in substantially the same regions. This is in contrast to human drivers that may be more susceptible to veering and thus vary the relative positioning of vehicles within a lane in a more random fashion. In addition, the wear of a roadway may be particularly problematic along certain roads that carry a relatively large number of heavy vehicles, such as dump trucks, 18-wheelers, or other vehicles that typically carry heavy cargo.

To help distribute wear across a surface of a lane more evenly, the vehicle controllers 20 of different vehicles may control the vehicles 12 such that each vehicle 12 travels at a slightly different position or offset from the lane centerline relative to other vehicles. There are various techniques that can be used to achieve this effect. In some embodiments, each vehicle 12 is assigned an offset value indicating amount of offset from a reference point, such as a lane boundary or centerline, that the vehicle 12 is travel down a lane 24. The offset values may be randomly assigned within a certain range so that the offset value of each vehicle 12 is likely different than most if not all of the other vehicles 12, but other techniques for determining the offset values are possible.

After the vehicle controller 20 receives the offset value assigned to its vehicle 12, the vehicle controller 20 controls operation of the vehicle 12 so that it travels down a lane at the offset assigned to it. In controlling the position of the vehicle 12 within the lane 24, the vehicle controller 20 may determine the vehicle's local position based on radar reflections from the markers described above, or some other techniques for determining the vehicle's location may be used (e.g., using a camera that images a lane so that the vehicle's position within the lane may be determined by identifying road markings or boundaries in the captured images).

In some embodiments, the offset values are algorithmically determined based on various factors, such as vehicle type, size, or weight. In this regard, the offset values assigned to the vehicles 12 may be controlled by a central or remote server (not shown) in communication with the vehicle controllers 24. Each vehicle controller 24 may be configured to submit a request for an offset value for a lane 24 as the vehicle 12 is traveling down the lane 24 or before entering the lane 24. Such request may include information about the vehicle 12, such as it type, size, or weight. In response to receiving such request, the remote server may be configured to use the vehicle information in the request, such as type, size, or weight, to determine an offset value for the vehicle 12 and return such offset value to the vehicle controller 20 for use in controlling the position of the vehicle 12 within the lane 24, as described above. As an example, the remote server may consider the offsets assigned to other vehicles of a similar type, size, or weight and select an offset value for the current vehicle 12 that is significantly different than the offset values or the average of the offset values for the other vehicles of a similar type, size, or weight. Various other techniques for selecting a desired offset value are possible.

An embodiment of a spinning actuator marker 212 is depicted in FIG. 12, where a traffic light assembly 210 encases or otherwise supports actuator marker 212. The frequency or speed of rotation of the marker 212 conveys a unique radar signature that corresponds to the signal conveyed by the traffic light assembly 210. For instance, one frequency may indicate that the traffic light assembly 210 is conveying a red (stop) signal, another frequency may indicate that the traffic light assembly 210 is conveying a green (go) signal, and another frequency may indicate that the traffic light assembly 210 is conveying a yellow signal, as described for FIG. 8A. However, other messages are capable of being conveyed by the marker 212. For instance, the frequency of the marker 212 may be configured to convey a message alerting a vehicle 12 to an impending change in the traffic signal, such as from red-to-green, yellow-to-red, or green-to-yellow, and thus permit vehicle controller 20 to adjust vehicle speed or operation accordingly.

As an example, knowing that the traffic light assembly 210 is about to transition from green-to-yellow, the vehicle controller 20 of an approaching vehicle 12 may begin to slow sooner than it otherwise would relative to an embodiment in which it was only able to discern the current state of the traffic light assembly 210. This may help to improve safety or conserve fuel. In some embodiments, the frequency of the marker 212 may convey a value indicative of the time that the traffic light assembly 210 will transition to the next state. For example, the marker 212 may convey a countdown where the value conveyed is decreased to mark the current time remaining until the change of state, such as a transition from green-to-yellow, yellow-to-red, or red-to-green. Thus, the frequency of rotation may be continuously or repetitively changed to indicate such time remaining. In other embodiments, other techniques are possible for indicating the amount of time remaining or that a transition of a state of the traffic light assembly 210 is imminent. For example, the positional orientation of a marker may be used to indicate the state of the traffic light assembly 210, according to the techniques described above for FIGS. 8A and 8B.

Note that the location of marker 212 is shown in a top portion of the traffic light assembly 210 in the depicted example, such as at the location of or coupled to a red light of the assembly 210 though other locations are contemplated. As an example, a respective marker 212 may be located on or coupled to each light of the assembly. In such an example, the corresponding marker 212 at or coupled to a light currently emitting a light signal may be activated (e.g., spinning) while the other markers are deactivated (e.g., not spinning) to indicate which lights are currently emitting signals. In another embodiment, the light(s) currently emitting a signal may be spinning at one frequency or rate while the light(s) that for which emission of a signal is eminent may be spinning at another frequency or rate to indicate the impending transition of the state of the assembly 210. In some instances, a marker 212 may be located proximate, but not connected to, the traffic light assembly 210.

Referring now to FIG. 13, an embedded radar reflective marker 312 is shown attached to or embedded within a lane reflector 310. Such a lane reflector 310 may be positioned on a roadway to indicate a boundary or other aspect of the roadway. As an example, reflectors 310 may be positioned along a lane line (e.g., centerline 314 of a roadway) that is used to mark a boundary of the lane. The reflector 310 is composed of a material that reflects light from the headlights of vehicles so that drivers can better visualize the boundary or other reference marked by the reflector 310 at night or during reduced visibility.

The marker 312 is positioned to provide radar-detectable information about the location of centerline 314 or other lane or road boundaries. That is, by reflecting radar signals, the marker 312 and, thus, reflector 310 is visible to the radar system 14 such that the vehicle controller 20 can use the radar information from the radar system 14 to determine the location of the boundary marked by the marker 312 and reflector 310. Such information may be particularly helpful when road conditions make visual detection of boundaries difficult or impossible, such as when roads are covered in snow or in low light conditions.

Figure 14:
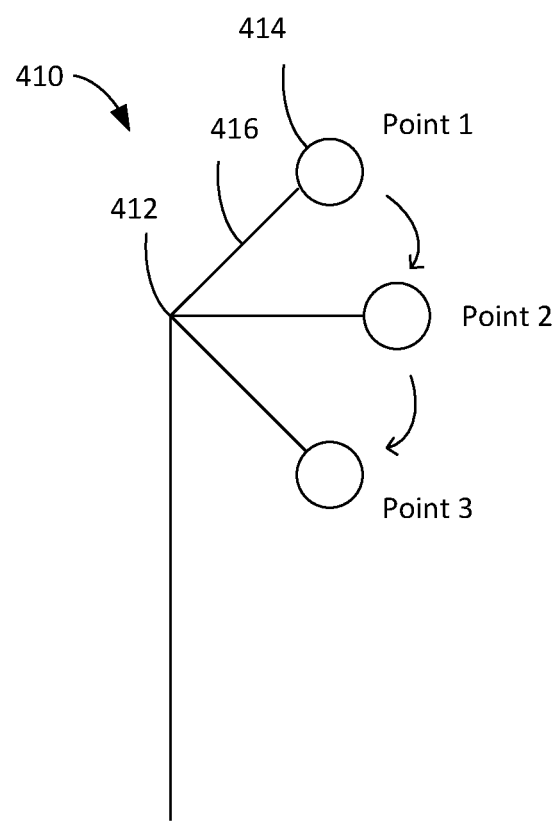
FIG. 14 is a schematic illustration of an exemplary embodiment of a traffic signal communication system of the present disclosure, where a radar reflective marker is provided to convey traffic directives via the radar system of a vehicle.

Referring now to FIG. 14, an exemplary embodiment of a traffic signal apparatus communication system is displayed. The traffic signal apparatus communication system includes a traffic signal apparatus 410 with at least one spatially-encoded marker 414 and a vehicle to recognize communications from traffic signal apparatus 410. Like traditional traffic signals, the traffic signal apparatus 410 of the present disclosure provides traffic directives so that vehicles may navigate roadways and intersections of roadways safely and effectively. For instance, traffic signal apparatus 410 may convey traffic directives such as stopping a vehicle from entering a traffic intersection, permitting a vehicle to enter a traffic intersection, prohibiting a traffic maneuver, permitting a traffic maneuver, directing a direction of traffic, or informing of the timing of any thereof. Traffic maneuvers that may be directed according to communications from traffic signal communication system include right and left turns, U-turns, vehicle slowing, vehicle stopping, vehicle starting, vehicle reversing direction, and vehicle yielding. However, other maneuvers compatible with roadway features, lane positions, traffic direction, and intersection configurations are compatible with the present disclosure.

Traffic directives are to be followed immediately upon reception in some instances, while in other instances traffic directives are to be followed at a specific time in the future, or are configured to provide a warning for upcoming transitions of traffic states. For instance, a traffic directive may provide warning to a vehicle that a flow of traffic through an intersection will change after a period of time, such as after 1 second, 5 seconds, 10 seconds, or other amounts of warning time. The vehicle controller 20 may receive this information and instruct system controllers 21 to alter vehicle operations in anticipation of the upcoming change in traffic flow. For example, traffic signal apparatus 410 may function similarly to a typical traffic signal at an intersection by providing a directive for a vehicle to stop, become prepared or warned to stop, or go. Traffic signal apparatus 410, however, may further indicate that a "prepare to stop" directive will change to a "stop" directive after 1 second, allowing the vehicle to decelerate at an appropriate rate.

The reception of the message or messages conveyed by traffic signal apparatus 410 is undertaken by vehicle controller 20 of the vehicle. In particular, a sensor system of the vehicle is configured to identify the traffic signal apparatus 410 and its spatially-encoded marker or markers 414 and communicate a signal from markers 414 to vehicle controller 20. Upon reception of the signal, vehicle controller 20 determines the message communicated by the markers 414 and provides instructions for altered vehicle operation in response to the message.

When the sensor system is a radar system 14, the radar transmitter 16 is configured to transmit a radar signal and radar receiver 18 is configured to receive returns of the radar signal from the at least one spatially-encoded marker 414, as described above. Vehicle controller 20 is configured to determine the message or messages encoded by spatially-encoded marker 414 based on the returns. The message describes a traffic directive that the vehicle is to observe, and system controllers 21 respond to the directive by adjusting vehicle systems to bring vehicle operation into compliance with the directive. For example, a directive to stop the vehicle is acted on by the brakes 44, while a directive to begin a turn is acted on by engine 40 and steering system 48.

While traditional traffic signals operate by visual recognition of signal output, traffic signal apparatus 410 may be detected using alternative or multiple sensing systems. For example, traffic signal apparatus 410 may be identified using visual sensors, such as cameras, or through radar or lidar systems. In some embodiments, traffic signal apparatus 410 is detectable and capable of communicating with more than one sensor system, such as both cameras and radar system 14. In such instances, traffic signal apparatus 410 includes one or more light sources for emitting light of one or more colors to convey a visual traffic directive. The traffic signal apparatus 410 may have three or more light sources. In some instances, a first light source emits light of a first color or wavelength that represents a traffic directive for a vehicle 12 to stop and indicates that the vehicle 12 is prohibited from entering or passing through an intersection. This first color may be the color red or some other color as may be desired. In some instances, a second light source emits light of a second color or wavelength that represents a traffic directive that serves as a warning that vehicles may soon be prohibited from entering and passing through an intersection. This second color may be the color yellow or some other color as may be desired. In some instances, a third light source emits light of a third color or wavelength that represents a traffic directive for a vehicle 12 to go, enter, or pass through an intersection. This third color may be the color green or some other color as may be desired. Traffic signal apparatus 410 may include other visual signals or indicators, such as other color lights, shapes, words, or images.

Whether traffic signal apparatus 410 is or is not configured for visual detection, it conveys its message or messages through means detectable using non-visual systems. For example, when traffic signal apparatus 410 is in communication with radar system 14 of a vehicle, it uses spatially-encoded markers 414 for detection and interpretation. The position, orientation, frequency, spacing, number, or other detectable pattern or characteristic of spatially-encoded markers 414 provides an encoded message, which is conveyed by radar system 14 to vehicle controller 20.

For example, in FIG. 14, the at least one spatially-encoded marker 414 comprises a movable element and an actuator 412 coupled to the movable element. The moveable element may include an arm 416 with marker 414 extending from arm 416, as depicted. However, in embodiments not shown, movement of marker 414 is afforded without an arm. Actuator 412 is configured to move the movable element to provide a message indicating a traffic directive. When vehicle 412 receives radar signal indicating the movement of marker 414, at least one controller is configured to determine a message based on the movement of the movable element. For instance, vehicle controller 20 may determine the movement pattern of marker 414 and identify its corresponding message. Movement patterns include positions of the moveable element, as well as the speed and/or direction of movement of the moveable element. Vehicle controller 20 is configured to determine a value associated with motion of the moveable element of marker 414. The value may indicate a speed or frequency of motion, or a position, such as an elevation or offset of the moveable element. In some instances, both position and frequency provide messages or different components of a message. For example, alternating movement between points 1 and 2 of FIG. 14 at a particular frequency may indicate both an upcoming first traffic directive and a timing of a transition to the first traffic directive. Similarly, alternating movement between points 2 and 3 of FIG. 14 at a particular frequency may indicate both an upcoming second traffic directive and a timing of a transition to the second traffic directive.

In some instances, the position of a moveable element of marker 414 provides a traffic directive. In the exemplary embodiment of FIG. 14, the position shown at point 1 may indicate a traffic directive to enter or pass through an intersection, such as would be typically indicated using a green light of a traffic signal apparatus. The position shown at point 2 may indicate a traffic directive to warn of an upcoming directive to prohibit traffic flow through an intersection, such as would be typically indicated using a yellow light of a traffic signal apparatus. Similarly, the position shown at point 3 may indicate a traffic directive to prohibit entrance or passage through an intersection, such as would be typically indicated using a red light of a traffic signal apparatus.

Further, movement of the marker 414 may be used to indicate an amount of time remaining until transition of the traffic light. As an example, when the traffic signal is emitting a yellow light, the marker may be repetitively moved between points 1 and 2 at a frequency that corresponds with the amount of time remaining before the traffic signal transitions to a red light. For example, the speed of movement between the points 1 and 2 and, thus, the frequency may be greater to indicate a longer time until the transition from yellow-to-red, and the speed of movement and, thus, frequency may be decreased as the time to the transition from yellow-to-red decreases. Thus, the vehicle controller 20, based on a measurement of the speed or frequency of the marker 414, can determine how much time is remaining until occurrence of the transition from yellow-to-red. Once the traffic signal does transition to red, the marker 414 may be stopped at point 1 to indicate that the traffic signal is red.

Figure 15:
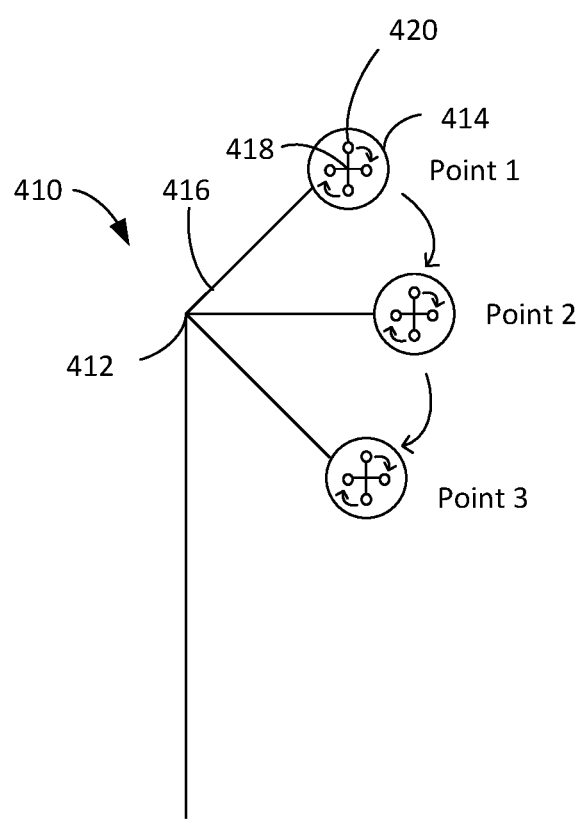
FIG. 15 is a schematic illustration of an exemplary embodiment of the traffic signal communication system of FIG. 14, where the radar reflective marker includes an actuated element that conveys traffic directives through both marker position and rotational frequency.

Now referring to FIG. 15, traffic signal apparatus 410 includes at least one spatially-encoded marker 414 having a first moveable element that alters the position of marker 414, as well as a second movable element 420 that spins at different frequencies. Thus, marker 414 may convey a message using the position of the first moveable element, the frequency of motion of the first moveable element, and/or the frequency of the spinning second moveable element 420. A first actuator 412 affords motion of the first moveable element arms 416, while a second actuator 418 affords the motion of second moveable element 420. In an exemplary embodiment, such as depicted in FIG. 15, the position shown at point 1 may indicate a traffic directive to enter or pass through an intersection, such as would be typically indicated using a green light of a traffic signal apparatus, while the frequency of motion of element 420 indicates a timing of the traffic directive. The position shown at point 2 may indicate a traffic directive to warn of an upcoming directive to prohibit traffic flow through an intersection, such as would be typically indicated using a yellow light of a traffic signal apparatus, while the frequency of motion of element 420 indicates a timing of the traffic directive. Similarly, the position shown at point 3 may indicate a traffic directive to prohibit entrance or passage through an intersection, such as would be typically indicated using a red light of a traffic signal apparatus, while the frequency of motion of element 420 indicates a timing of the traffic directive. In each case, the timing may provide a duration of the current traffic directive or a duration of time until a transition to another state indicated by traffic signal apparatus 410.

Figure 16:
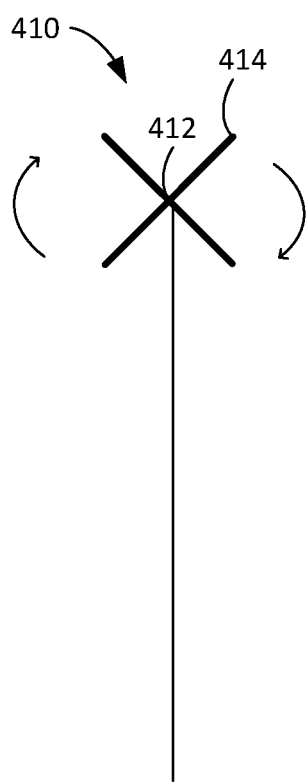
FIG. 16 is a schematic illustration of an exemplary embodiment of the traffic signal communication system of FIG. 14, where the radar reflective marker conveys traffic directives through rotational frequency.

In FIG. 16, another embodiment of the traffic signal apparatus 410 is depicted, where frequency of spatially-encoded marker 414 provides a message to vehicle 12. Marker 414 is driven by actuator 412, which causes marker 414 to spin at a frequency corresponding to a particular message. For instance, a first frequency may indicate a traffic directive to enter or pass through an intersection, such as would be typically indicated using a green light of a traffic signal apparatus. A second frequency may indicate a traffic directive to warn of an upcoming directive to prohibit traffic flow through an intersection, such as would be typically indicated using a yellow light of a traffic signal apparatus. Similarly, a third frequency may indicate a traffic directive to prohibit entrance or passage through an intersection, such as would be typically indicated using a red light of a traffic signal apparatus. A different message or category of messages may be provided by altering the direction of spinning. For instance, a counterclockwise spin of marker 414 may indicate a traffic directive to enter or pass through a traffic intersection, while a clockwise spin may indicate a traffic directive prohibiting the entrance or passage of traffic through a traffic intersection. Such a message format based on spin direction may also indicate a direction of traffic flow through a traffic lane. For instance, a counterclockwise spin of marker 414 may indicate that a lane permits traffic flow in a first direction, while a clockwise spin indicates traffic flow in a second direction.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

The invention claimed is:

1. A system comprising:
   a traffic signal apparatus for controlling traffic at an intersection, the traffic signal apparatus having at least a first light source for emitting light of a first color for indicating a stop signal, a second light source for emitting light of a second color for indicating a warning signal, and a third light source for emitting light of a third color for indicating a go signal, the traffic signal apparatus having at least one spatially-encoded marker; and
   a vehicle having at least one controller and a radar,
   the radar configured to transmit a radar signal and receive returns of the radar signal from the at least one spatially-encoded marker,
   the at least one spatially-encoded marker comprises a movable element and an actuator coupled to the movable element, wherein the actuator is configured to move the movable element,
   the at least one controller configured to determine a message based on movement of the movable element based on the returns and to control the vehicle based on the message, wherein the message describes a traffic directive given by the traffic signal apparatus.

2. The system of claim 1, wherein the at least one controller is configured to identify a movement pattern of the at least one spatially-encoded marker based on the returns and to determine the message based on the identified movement pattern.

3. The system of claim 1, wherein the at least one controller is configured to determine a value indicative of a speed of movement of the movable element, and wherein the at least one controller is configured to determine the message based on the value.

4. The system of claim 1, wherein the at least one controller is configured to identify a spatial pattern of the at least one spatially-encoded marker based on the returns and to determine the message based on the identified spatial pattern.

5. The system of claim 1, wherein the message indicates the traffic directive to stop the vehicle from entering a traffic intersection or to permit a vehicle to enter a traffic intersection.

6. The system of claim 1, wherein the message indicates the timing of the traffic directive to stop the vehicle from entering a traffic intersection or to permit a vehicle to enter a traffic intersection.

7. The system of claim 1, wherein the message indicates the traffic directive to permit or to prohibit a traffic maneuver.

8. The system of claim 7, wherein the traffic maneuver is a turn at a traffic intersection.

9. The system of claim 1, wherein the message includes a value indicating a time to a transition of a new state of the traffic signal apparatus, wherein the new state includes emission of light from one of the first light source, the second light source, or the third light source.

10. A method of communicating traffic signal information to a vehicle, the method comprising:
   receiving, by at least one controller, returns of a radar signal from at least one spatially-encoded marker of a traffic signal apparatus, wherein the at least one spatially-encoded marker comprises a movable element;
   determining a message based on a detected movement of the movable element based on the returns; and
   controlling the vehicle based on the message, wherein the message describes a traffic directive given by the traffic signal apparatus.

11. The method of claim 10, further comprising identifying a spatial pattern of the at least one spatially-encoded marker based on the returns, wherein the determining of the message is based on the identified spatial pattern.

12. The method of claim 11, wherein the identifying comprises determining an orientation of the at least one spatially-encoded marker.

13. The method of claim 10, further comprising identifying a movement pattern of the at least one spatially-encoded marker based on the returns, wherein the determining of the message is based on the identified movement pattern.

14. The method of claim 10, further comprising determining a value indicative of a speed of movement of the movable element, and wherein the determining of the message is based on the value.

15. The method of claim 10, wherein the message indicates the traffic directive to stop the vehicle from entering a traffic intersection or to permit a vehicle to enter a traffic intersection.

16. The method of claim 10, wherein the message indicates the timing of the traffic directive to stop the vehicle from entering a traffic intersection or to permit a vehicle to enter a traffic intersection.

17. The method of claim 10, wherein the message indicates the traffic directive to permit or to prohibit a traffic maneuver.

18. The method of claim 17, wherein the traffic maneuver is a turn at the traffic intersection.

19. The method of claim 10, wherein the traffic signal apparatus comprises at least a first light source for emitting light of a first color for indicating stop signal, a second light source for emitting light of a second color for indicating a warning signal, and a third light source for emitting light of a third color for indicating a go signal.

20. The method of claim 19, wherein the message includes a value indicating a time to a transition of a new state of the traffic signal apparatus, wherein the new state includes emission of light from one of the first light source, the second light source, or the third light source.

21. A system comprising:
   a traffic signal apparatus for controlling traffic at an intersection, the traffic signal apparatus having at least a first light source, a second light source, and a third light source, the traffic signal apparatus having at least one spatially-encoded marker; and
   a vehicle having at least one controller and a radar,
   the radar configured to transmit a radar signal and receive returns of the radar signal from the at least one spatially-encoded marker,
   the at least one spatially-encoded marker comprises a movable element and an actuator coupled to the movable element, wherein the actuator is configured to move the movable element,
   the at least one controller configured to determine a message based on movement of the movable element based on the returns and to control the vehicle based on the message, wherein the message describes a traffic directive given by the traffic signal apparatus.

22. The system of claim 21, wherein the message includes a value indicating a time to a transition of a new state of the traffic signal apparatus, wherein the new state includes emission of light from one of the first light source, the second light source, or the third light source.

* * * * *